US012580969B1

(12) United States Patent
Wright et al.

(10) Patent No.: US 12,580,969 B1
(45) Date of Patent: Mar. 17, 2026

(54) SYSTEMS AND METHODS FOR SELECTIVE INFORMATION ACCESS BASED ON NETWORK PERFORMANCE

(71) Applicant: DK Crown Holdings Inc., Boston, MA (US)

(72) Inventors: Peter Wright, Manahawkin, NJ (US); Gregory Andrew Lozeau, Marshfield, MA (US); Stephen Anthony Rose, Boston, MA (US)

(73) Assignee: DK Crown Holdings Inc., Irvine, CA (US)

( * ) Notice: Subject to any disclaimer, the term of this patent is extended or adjusted under 35 U.S.C. 154(b) by 0 days.

(21) Appl. No.: 19/209,283

(22) Filed: May 15, 2025

(51) Int. Cl.
H04L 9/40 (2022.01)
(52) U.S. Cl.
CPC .................................... H04L 63/20 (2013.01)
(58) Field of Classification Search
CPC ....................................................... H04L 63/20
USPC ............................................................. 726/26
See application file for complete search history.

(56) References Cited

U.S. PATENT DOCUMENTS

2023/0231821 A1* 7/2023 Jeon ...................... H04L 67/303
 709/206
2023/0269156 A1* 8/2023 Hong .................. H04L 43/0858
 370/252
2024/0135349 A1* 4/2024 Paradise ................ G06Q 20/12

* cited by examiner

*Primary Examiner* — Anthony D Brown
(74) *Attorney, Agent, or Firm* — Foley & Lardner LLP

(57) ABSTRACT

Systems and methods for selectively providing selective information access based on network performance are disclosed. A system maintains application state information for a protected network session involving multiple client devices accessing the application. The system generates latency metrics for each client based on received network communications. Using the application state information, the system determines whether the latency metric of a first client device meets an interruption criterion. Upon satisfying the criterion, the system selectively provides the first client device with a first graphical content representing the application state. Client devices whose latency metrics do not meet the interruption criterion are selectively provided with a second graphical content representing the application state.

18 Claims, 11 Drawing Sheets

400

500

SYSTEMS AND METHODS FOR SELECTIVE INFORMATION ACCESS BASED ON NETWORK PERFORMANCE

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

The systems and methods of this technical solution provide techniques for secure formation of network sessions including multiple computing devices. Computing devices assigned to a network session may interact according to asset of protocols, and the network session may conclude once a condition has been met. For example, the protocols may restrict data transmission between computing devices to maintain fidelity of the network session. However, in some examples, an attribute of a computing device may not be compatible with maintaining fidelity of network sessions. The systems and methods of this technical solution address these and other issues by assigning a computing device to a network session based on at least one security criterion. The security criterion may establish whether attributes of the computing device are compatible with attributes of other computing devices assigned to the network session to maintain security of the network session.

The systems and methods of this technical solution can provide techniques for communicating differentiated information to various computing devices within a network session of an application based on the latency metrics of those devices. Given various real-time or near real-time requirements of network applications, maintaining the state of a network application that involves interactions with multiple computing devices can be challenging, particularly when some devices experience poor network connectivity. For example, in some circumstances, one or more updates to a state of the network application can be dependent on a single computing device for data transmission, and poor network connection of that device can negatively impact the efficiency of the application for all connected computing devices. The techniques described herein mitigate such issues by leveraging network latency information of computing devices to dynamically adjusting the state data transmitted to each device.

One aspect of the present disclosure relates to a system. The system can receive, from a first client device of a plurality of client devices, a request to access one of a plurality of protected network sessions associated with a network application. The system can identify a first candidate protected network session of the plurality of protected network sessions. The first candidate protected network session can identify a subset of the plurality of client devices. The system can determine that the first candidate protected network session fails to satisfy at least one security criterion based on location information of the first client device and respective location information of each client device of the subset. The system can identify a second candidate protected network session of the plurality of protected network sessions based on the first candidate protected network session failing to satisfy the at least one security criterion. The system can update the second candidate protected network session to include an identifier of the first client device based on the second candidate protected network session satisfying the at least one security criterion.

In some implementations, the system can determine the location information based on the request to access one of the plurality of protected network sessions. In some implementations, the system can determine the location information by transmitting a request for the location information to a computing system. In some implementations, the system can determine the location information based on at least one identifier of a network via which the first client device transmitted the request to access one of the plurality of protected network sessions. In some implementations the system can determine the location information based on a Haversine function. In some implementations, the system can determine that the first candidate protected network session fails to satisfy the at least one security criterion based on the location information indicating that the first client device is located within a threshold distance of at least one client device of the subset. In some implementations, the system can initiate the second candidate protected network session of the plurality of protected network sessions in response to determining that a number of client devices participating in the second candidate protected network session satisfies a threshold. In some implementations, the system can initiate the second candidate protected network session of the plurality of protected network sessions in response to a request from the first client device.

In some implementations, the system can determine, based on state information of the network application, that the network latency information of the first client device satisfies an interruption criterion for the application. In some implementations, the system can selectively provide, to the first client device, first data corresponding to display of a first graphical content to represent the state information of the application based on the network latency information of the first client device satisfying the interruption criterion. In some implementations, the system can selectively provide, to a second client device participating in the second candidate protected network session, second data corresponding to display of a second graphical content to represent the state information of the network application based on second network latency information of the second client device not satisfying the interruption criterion.

Another aspect of the present disclosure relates to a method. The method includes receiving, by at least one server, from a first client device of a plurality of client devices, a request to access one of a plurality of protected network sessions associated with a network application. The method includes identifying, by the at least one server, a first candidate protected network session of the plurality of protected network sessions, the first candidate protected network session identifying a subset of the plurality of client devices. The method includes determining, by the at least one server, that the first candidate protected network session fails to satisfy at least one security criterion based on location information of the first client device and respective location information of each client device of the subset. The method includes identifying by the at least one server, a second candidate protected network session of the plurality of protected network sessions based on the first candidate protected network session failing to satisfy the at least one security criterion. The method includes updating by the at least one server, the second candidate protected network session to include an identifier of the first client device based on the second candidate protected network session satisfying the at least one security criterion.

In some implementations, the method includes determining, by the at least one server, the location information based on the request to access one of the plurality of protected network sessions. In some implementations, the method includes determining, by the at least one server, the location information by transmitting a request for the location information to a computing system. In some implementations, the method includes determining, by the at least one server, the location information based on at least one identifier of a network via which the first client device transmitted the request to access one of the plurality of protected network sessions. In some implementations, the method includes determining, by the at least one server, the location information based on a Haversine function.

In some implementations, the method includes determining, by the at least one server, that the first candidate protected network session fails to satisfy the at least one security criterion based on the location information indicating that the first client device is located within a threshold distance of at least one client device of the subset. In some implementations, the method includes initiating, by the at least one server, the second candidate protected network session of the plurality of protected network sessions in response to determining that a number of client devices participating in the second candidate protected network session satisfies a threshold. In some implementations, the method includes initiating, by the at least one server, the second candidate protected network session of the plurality of protected network sessions in response to a request from the first client device.

In some implementations, the method includes determining, by the at least one server, based on state information of the network application, that the network latency information of the first client device satisfies an interruption criterion for the application. In some implementations, the method includes selectively providing, by the at least one server, to the first client device, first data corresponding to display of a first graphical content to represent the state information of the application based on the network latency information of the first client device satisfying the interruption criterion. In some implementations, the method includes selectively providing, by the at least one server, to a second client device participating in the second candidate protected network session, second data corresponding to display of a second graphical content to represent the state information of the network application based on second network latency information of the second client device not satisfying the interruption criterion.

At least one aspect relates to a system. The system can include one or more processors. The system can maintain state information of an application associated with a protected network session, the protected network session identifying multiple client devices accessing the application. The system can generate network latency information for each client device based on at least one network communication from each client device of the multiple client devices. The system can determine, based on the state information of the application, that the network latency information of a first client device of the multiple client devices satisfies an interruption criterion for the application. The system can selectively provide, to the first client device, first data corresponding to display of first graphical content to represent the state information of the application based on the network latency information of the first client device satisfying the interruption criterion. The system can selectively provide, to a second client device of the multiple client devices, second data corresponding to display of second graphical content to represent the state information of the application based on the network latency information of the second client device not satisfying the interruption criterion.

In some implementations, the first data corresponds to a static interface and the second data corresponds to an animated interface. In some implementations, the static interface is representative of the state information of the application, and the animated interface corresponds to a loading interface for the application. In some implementations, the system can determine that the state information of the application satisfies at least one criterion. In some implementations, the system can determine that the network latency information for the first client device satisfies the interruption criterion for the application in response to the state information of the application satisfying the at least one criterion. In some implementations, the system can determine the network latency information of the first client device based on a network type of a network via which the first client device is communicating. In some implementations, the system can determine the network type based on a communication received from the first client device.

In some implementations, the interruption criterion comprises a threshold network latency. In some implementations, the system can determine that the network latency information for the first client device satisfies the interruption criterion based on the network latency information exceeding the threshold network latency. In some implementations, the first data comprises first instructions that cause the first client device to display the first graphical content, and the second data comprises second instructions that cause the second client device to display the second graphical content. In some implementations, the first data comprises a first indication that the interruption criterion is satisfied, and the second data comprises a second indication that the interruption criterion is not satisfied. In some implementations, the system can update the state information of the application based on at least one communication from the first client device or the second client device.

At least one other aspect relates to a method. The method can be performed, for example, by one or more processors coupled to non-transitory memory. The method can include maintaining state information of an application associated with a protected network session, the protected network session identifying multiple client devices accessing the application. The method can include generating network latency information for each client device based on at least one network communication from each client device of the multiple client devices. The method can include determining, based on the state information of the application, that the network latency information of a first client device of the multiple client devices satisfies an interruption criterion for the application. The method can include selectively providing, to the first client device, first data corresponding to display of first graphical content to represent the state information of the application based on the network latency information of the first client device satisfying the interruption criterion. The method can include selectively providing, to a second client device of the multiple client devices, second data corresponding to display of second graphical content to represent the state information of the application based on the network latency information of the second client device not satisfying the interruption criterion.

In some implementations, the first data corresponds to a static interface and the second data corresponds to an animated interface. In some implementations, the static interface is representative of the state information of the application, and the animated interface corresponds to a loading interface for the application. In some implementations, the method can include determining that the state information of the application satisfies at least one criterion. In some implementations, the method can include determining that the network latency information for the first client device satisfies the interruption criterion for the application in response to the state information of the application satisfying the at least one criterion. In some implementations, the method can include determining the network latency information of the first client device based on a network type of a network via which the first client device is communicating.

In some implementations, the method can include determining the network type based on a communication received from the first client device. In some implementations, the interruption criterion comprises a threshold network latency. In some implementations, the method can include determining that the network latency information for the first client device satisfies the interruption criterion based on the network latency information exceeding the threshold network latency. In some implementations, the first data comprises first instructions that cause the first client device to display the first graphical content, and the second data comprises second instructions that cause the second client device to display the second graphical content. In some implementations, the first data comprises a first indication that the interruption criterion is satisfied, and the second data comprises a second indication that the interruption criterion is not satisfied. In some implementations, the method can include updating the state information of the application based on at least one communication from the first client device or the second client device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for managing network sessions of network applications. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful. Section A describes a network environment and computing environment to implement embodiments described herein. Section B describes systems and methods for managing network sessions of network applications.

The systems and methods of this technical solution provide techniques for synchronized information sharing between multiple computing devices, which can provide additional notifications, alerts, or other content in connection with live events. Due to their real-time nature, it can be challenging to share up-to-date information network events between multiple computing devices, including between servers and client devices that access those servers. The systems and methods of this technical solution address these and other issues by providing synchronized data structures within network communication sessions. The synchronized data structures can include metadata generated to facilitate efficient and accurate data transfer between computing devices even in computer networks with large numbers of computing devices.

A. Computing and Network Environment for Managing Network Sessions of Network Applications Referring to FIG. 1A, an embodiment of a network environment is depicted for managing network sessions of network applications. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Figure 1A:
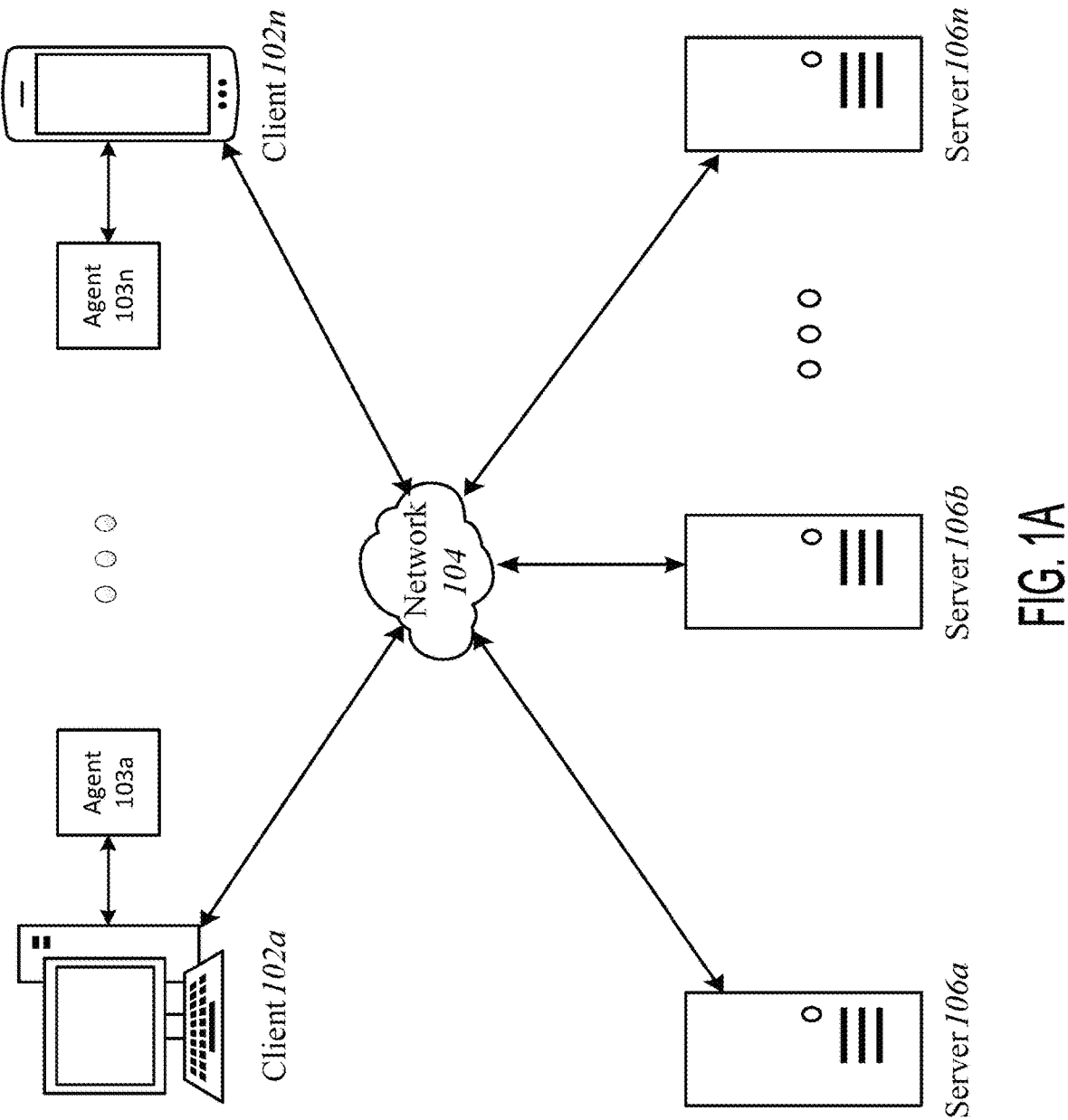
FIG. 1A is a block diagram depicting an embodiment of a network environment comprising a client device in communication with a server device.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
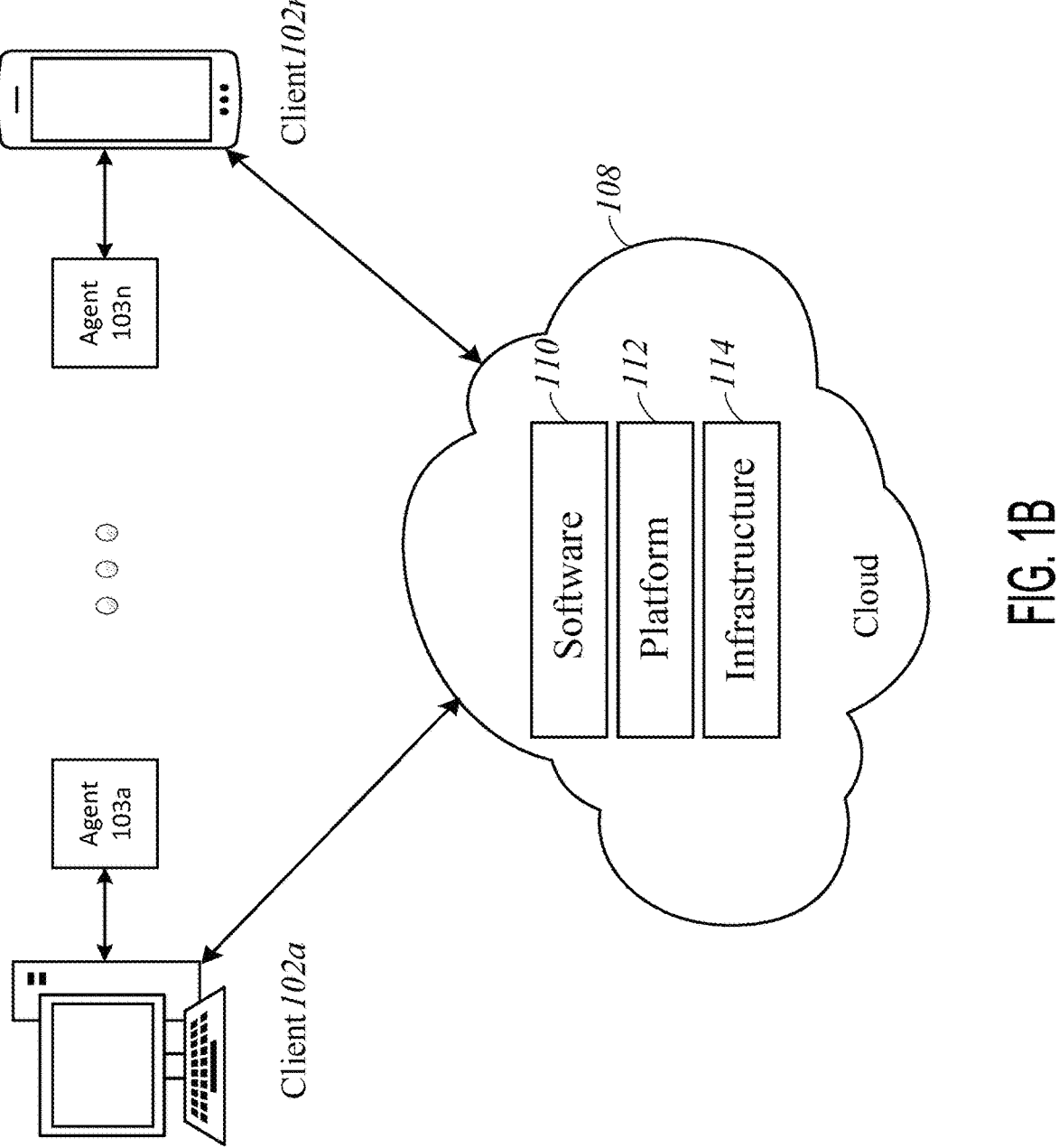
FIG. 1B is a block diagram depicting a cloud computing environment comprising a client device in communication with cloud service providers.

Referring to FIG. 1B, a cloud computing environment is depicted for managing network sessions of network applications. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
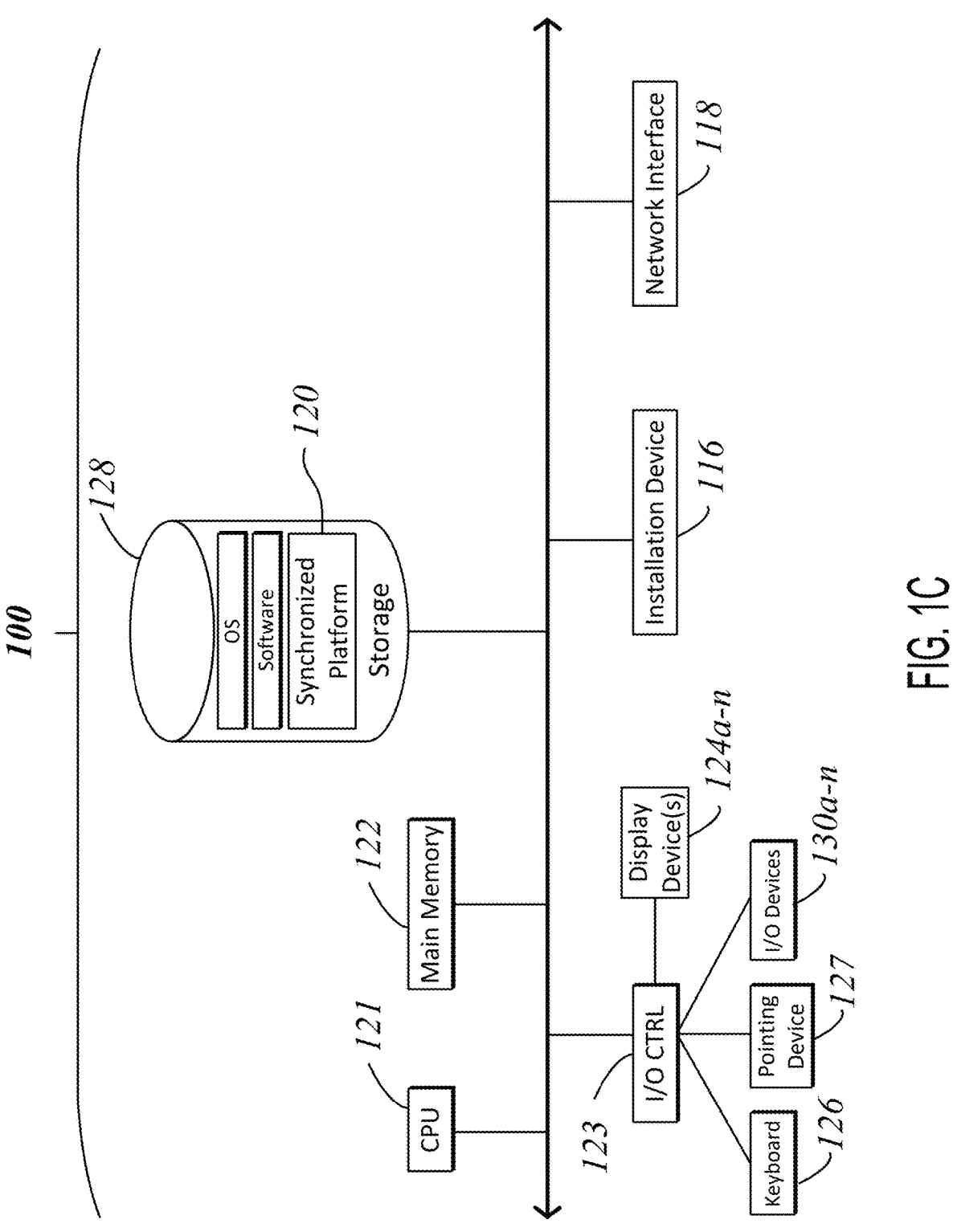
FIGS. 1C and 1D are block diagrams depicting embodiments of computing devices useful in connection with the methods and systems described herein.
Figure 1D:
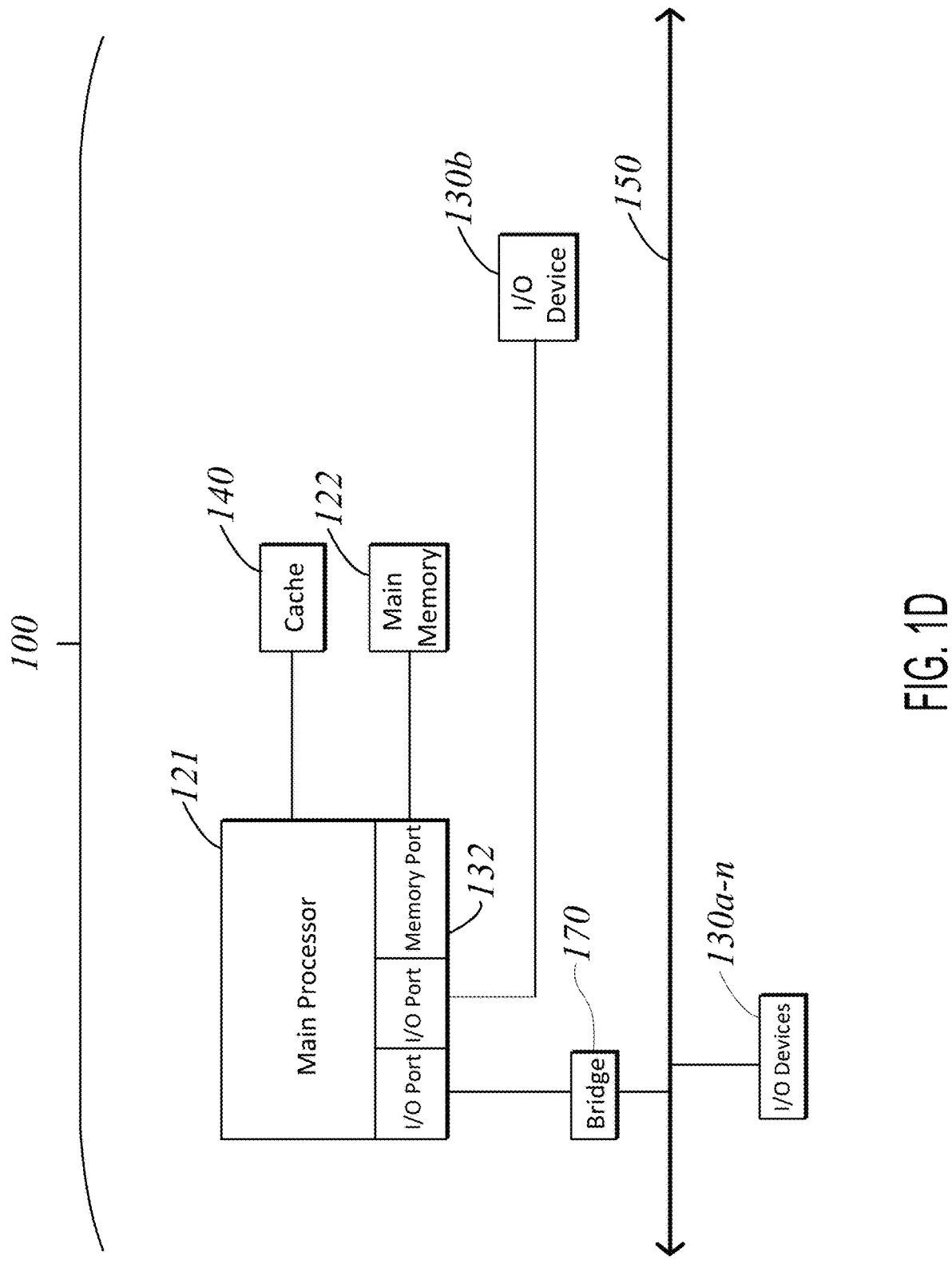

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for managing network sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANS-PORT, RAPIDIO, or INFINIBAND communications technology. FIG. 1D also depicts an embodiment in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102a-102n may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Managing Network Sessions of Network Applications

The systems and methods of this technical solution provide techniques for synchronized information sharing between multiple computing devices, which can provide additional notifications, alerts, or other content in connection with live events. Due to their real-time nature, it can be challenging to share up-to-date information network events between multiple computing devices, including between servers and client devices that access those servers. The systems and methods of this technical solution address these and other issues by providing synchronized data structures within network communication sessions. The synchronized data structures can include metadata generated to facilitate efficient and accurate data transfer between computing devices even in computer networks with large numbers of computing devices.

Figure 2:
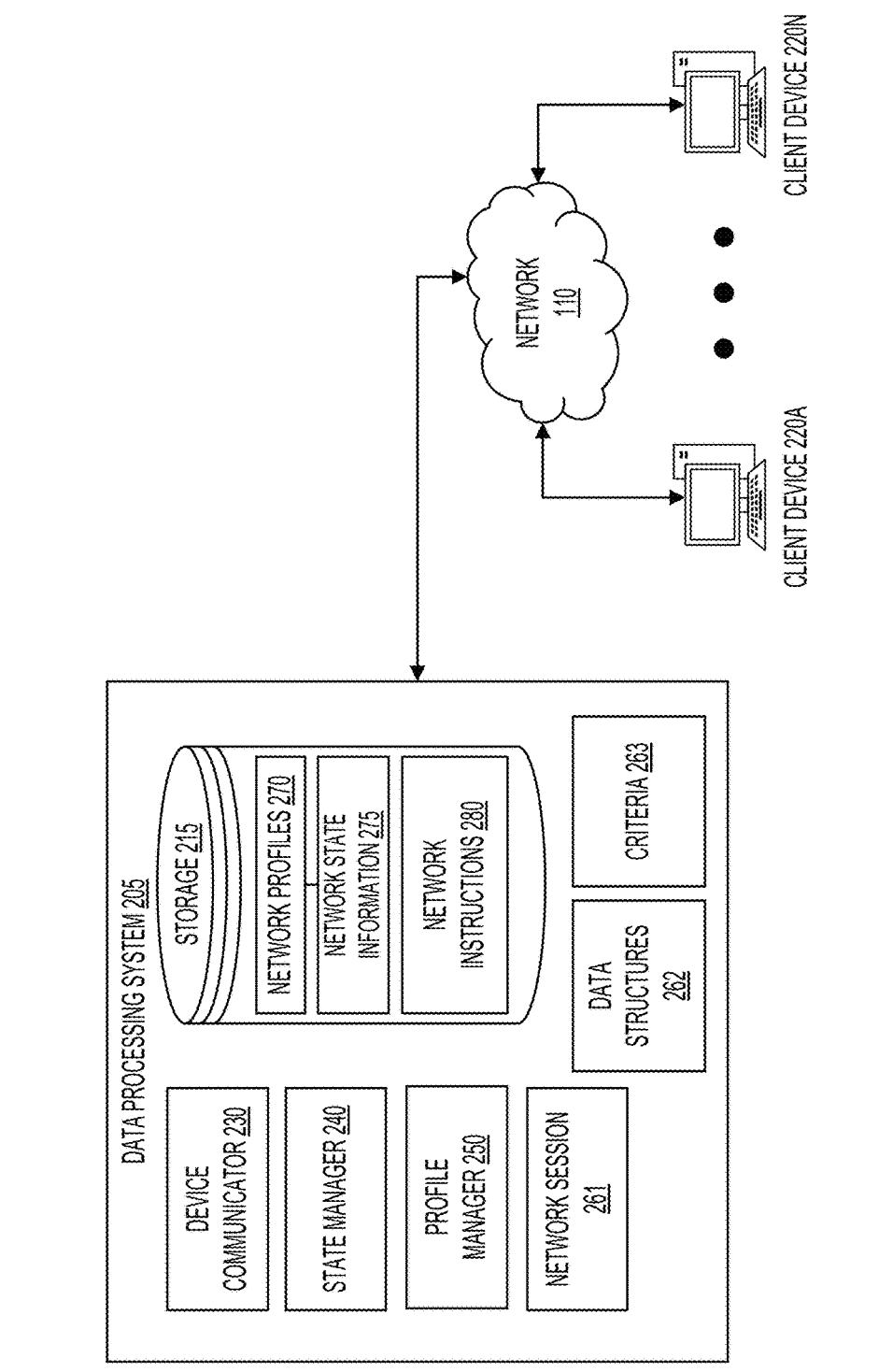
FIG. 2 is a block diagram of an example system for managing network sessions of network applications, in accordance with one or more implementations.

Referring now to FIG. 2, illustrated is a block diagram of an example system 200 managing network sessions of network applications, in accordance with one or more implementations. In FIG. 2, the system 200 can include at least one data processing system 205, at least one network 210, and one or more client devices 220A-220N (sometimes generally referred to individually or collectively as "client device(s) 220"). In FIG. 2, the data processing system 205 can include at least one device communicator 230, at least one state manager 240, at least one profile manager 250, and at least one storage 215. The storage 215 can include one or more network profiles 270 (sometimes referred to herein as "player profiles 270"), network state information (sometimes referred to herein as "game state information 275"), and one or more network instructions 280. The data processing system 205 is shown as including one or more network sessions 261, one or more data structures 262, and one or more criteria 263.

Each of the components (e.g., the data processing system 205, the network 210, the client devices 220, components thereof, etc.) of the system 200 can be implemented using the hardware components or a combination of software with the hardware components of a computing system, such as the server 106, the client computing system 102, or the computing system 100 described in connection with FIGS. 1A-1D, or any other computing system described herein.

The data processing system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-1D, or any other computing system described herein.

The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks.

The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the data processing system 205, the one or more client devices 220, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the server 106, the client computing system 102, the computing system 100, etc.) may also communicate wirelessly with the computing devices of the network 210 via a proxy device (e.g., a router, network switch, or gateway).

Each of the client devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the client computing system 102 or the computing system 100 described in connection with FIGS. 1A-1D, or any other computing system described herein.

Each client device 220 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display multiple in-game events as described herein. The display can include a touch screen displaying an application, such as the gaming applications described herein. The display can include a border region (e.g., side border, top border, bottom border).

In some implementations, each client device 220 can be associated with a physical location. Each client device 220 may connect to the network 210 via a central hub (e.g., cellular tower, access point, and/or the like) that is near the physical location of the client device 220. As an example, each client device 220 may connect to the network 210 via the nearest cellular tower. Interactions of each client device 220 over the network 210 may include an identifier of the central hub. For example, an internet protocol (IP) identifier may indicate the access point handling communications over the network 210. In this example, the IP address may be transmitted to the data processing system 205 as part of the request (e.g., to join a network session 261, in one or more network requests, etc.) to facilitate transmission of a response back to the client device 220. Identifiers, such as the IP address, may be used to determine location information of each client device 220. In some examples, the physical location of the client device 220 may also affect network connection. For example, client devices 220 that are far from the central hub or have obstructions may have a poor network connection, while client devices 220 that are close to the central hub may have a good network connection.

In some implementations, the display can include a touch screen display, which can display graphical content. The display can receive interactions from a player. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that enables a player to interact with and/or select one or more actionable objects as described herein. For example, a touchscreen display can enable interaction with one or more visual indications provided through the display of each mobile (or client) device 220, and responsive to an interaction (e.g., select, click-on, touch, hover), the client device 220 can generate an indication identifying a player input and/or selection of a wager, an in-game event, or an indication to participate in a bonus event, among others. The touchscreen display can depict graphical elements representing an action query and generate an indication of the action chosen by the player.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be a gaming application that communicates with the data processing system 205 to play games, as described herein. The client application can include an application executing on each client device 220 or provided to the client device 220 by the data processing system 205.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the network profiles 270, the network state information 275, or the network instructions 280, stored and maintained at the storage 215, and generate one or more actionable objects, such as the actionable objects (e.g., interactive objects) described herein below in connection with FIGS. 3A-5, to a user (sometimes referred to herein as a "player") through a client device 220. Such actionable objects can include player-selectable hyperlinks, buttons, graphics, videos, images, or other application features that generate a signal that is processed by the application executing on the respective client device 220.

In some implementations, one or more client devices 220 can establish one or more network sessions 261 with the data processing system 205. In some implementations, the one or more network sessions 261 can each include a channel or connection between the data processing system 205 and the one or more client devices 220. In some implementations, the one or more client devices 220 can transmit a request to join a communication session of the network sessions 261. The network sessions 261 can include the execution of a virtual application, in which one or more client devices 220 can interact via communications with the data processing system 205 according to protocol of the virtual application. The protocol of the virtual application can include, but are not limited to, rules and/or instructions associated with the virtual application (e.g., an interactive network application, an interactive game, etc.).

In some implementations, the one or more network sessions 261 can be or include one or more application sessions (e.g., of the virtual application), an execution session, a desktop session, a hosted desktop session, a terminal services session, a browser session, a remote desktop session, a URL session and/or a remote application session, among others. Each network session 261 can include encrypted and/or secure sessions, which can include an encrypted file, encrypted data or traffic. Each client device 220 can use the network session 261 established with the data processing system 205 to carry out any of the functionalities described herein. For example, the application executing on each client device 220 can perform any of the client-side operations described herein, including displaying any of the user interfaces shown in FIGS. 3A-3D, or any other types of user interfaces described herein.

Each of the client devices 220 can be computing devices configured to communicate via the network 210 to access information resources, such as web pages via a web browser, or application resources via a native application executing on a client device 220. When accessing information resources (e.g., instructions/assets for displaying/presenting, modifying, or otherwise navigating graphical user interface (s), etc.) the client device 220 can execute instructions (e.g., embedded in the native applications, in the information resources, etc.) that cause the client devices 220 to display various application interfaces, such as the user interfaces described herein below in conjunction with FIGS. 3A-3D. The application interfaces can be, for example, application interfaces that present different types of network information, or other types of interactive graphical user interfaces. In general, the graphical user interfaces may include various different types of interactive or non-interactive assets (e.g., images, video, animations, graphics, audio, etc.) that is presented to a user via the input/output interfaces of a client device 220.

In response to interactions with user interface elements, the client devices 220 can transmit information, such as network profile information (e.g., changing profile parameters, changing login information, any information stored in a network profile 270, etc.), interaction information, selections of wager amounts, selections of gaming participation events, or other signals to the data processing system 205. Information transmitted by the client devices 220 may advance the state of gaming sessions (e.g., network sessions 261 associated with a network application comprising a game). Gaming sessions may advance to a subsequent stage based on receiving interaction information (e.g., selection of wager amounts) from the involved client devices 220. In some implementations, a client device 220 can transmit a request to access a network session 261. The request can include, for example, a request to play a particular game (e.g., can include a game identifier, etc.). The request can be transmitted as or may include a hypertext transfer protocol (HTTP or HTTPS) request message, a file transfer protocol message, an email message, a text message, or any other type of message that can be transmitted via the network 210.

The data processing system 205 is shown as including the storage 215. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220 (e.g., via the user interface similar to that depicted in FIGS. 3A-3D, etc.), or any other computing devices described herein.

The storage 215 can store one or more network sessions 261. A network session 261 can include a record of one or more interactions between the client devices 220 and the data processing system 205. For example, a network session 261 can include record of wagers transmitted by client devices 220. In some implementations, a new network session 261 can be initiated based on one or more conditions. For example, the network session 261 can be initiated in response to a request from a client device 220 to access a network session 261. For example, the data processing system 205 can initiate a new network session 261 based on determining that there are no suitable network sessions for the client device 220 to join. Suitable network sessions can be network sessions 261 that satisfy the security criterion and/or have not started (e.g., a game associated with the network session has not begun). In some implementations, network sessions 261 can be terminated. In response to the termination of a network session 261, the storage 215 can store a final result of the network session 261. For example, the storage 215 can a winner of a game associated with the network session 261.

The storage 215 can store one or more network profiles 270 associated with a user (sometimes referred to herein as a "player") of a client device 220. In some implementations, the network profiles 270 may sometimes be referred to as "player profiles 270". A network profile 270 of a player can be a user profile that includes information about the player and information about one or more of the client devices 220 used to access the data processing system 205 using the network profile 270. For example, identifiers of the network profile 270 can be used to access the functionality of the data processing system 205 (e.g., by logging into the data processing system 205 via one or more web-based interfaces). The identifiers can include a username, a password, an e-mail address, a phone number, a personal identification number (PIN), a secret code-word, device identifiers for use in a two-factor authentication technique, among others. The network profile 270 can store information about wagers, games, and gaming events that are performed by the player via the data processing system 205. The network profile 270 can store a credit balance, wager information or side wager information (e.g., an amount of a wager/side wager, a timestamp associated with a wager/side wager, information about gaming conditions or game state information that resulted in a side wager, a client device identifier of a client device 220 that was used to place the wager/side wager, etc.). The network profile 270 can store information about a client device 220 used to access the data processing system 205 such as an IP address, a MAC address, a GUID, a network profile name (e.g., the name of a user of the client device 220, etc.), device name, among others. For example, the network profile 270 can store location information determined based on interactions between each client device 220 and the data processing system 205. In some implementations, the network profile 270 can be created by the data processing system 205 in response to the network profile creation request transmitted by a client device 220. The network profile creation request can include any of the network profile information described herein.

The storage 215 can store or maintain network state information 275 associated with each of the one or more network profiles 270, for example, in one or more data structures. The network state information 275 can include information for interactive applications (e.g., desktop/network applications, remote desktop applications, interactive games, etc.) previously or currently accessed by a client device 220 using a corresponding network profile 270. In some implementations, a client device 220 accessing the data processing system 205 may not be associated with a network profile 270. In such implementations, the data processing system 205 can automatically create a network profile 270 using an identifier of the client device 220 provided by the client device 220. The network state information 275 can include any information relating to one or more network sessions 261 between a client device 220 and a data processing system 205. In some implementations, the network state information 275 can include state information for one or more network applications provided by the data processing system 205 to a client device 220. For example, the network state information 275 can include information relating to wagers, additional/side wagers, hands, actions, interactions, or other data provided by the client device 220 during a play of a game or according to any other network application provided by the data processing system 205. As described in further detail herein, the state manager 240 can maintain (e.g., store, update, etc.), in corresponding network state information 275, a respective network state of applications as they are being accessed for multiple users accessing the data processing system 205. The network state information 275 can include one or more data structures that include any information related to a network state, including any values or data stored for an application instance accessed via a network session 261. In an example of a game, the network state information 275 can include information such as current cards held by a player (e.g., in a blackjack game, poker game, or another card game, etc.), wager information, information about whether the player has indicated a desire to participate in additional bonus award opportunities, or any other state data described herein.

In another example, the network state information 275 can include turn information (e.g., which user has the current turn, how many game turns have elapsed, etc.) for one or more applications/games provided via the data processing system 205. In some implementations, information used to update the network state information 275 can be received as a play of the game occurs (e.g., as the play is processed by the data processing system 205 according to the game instructions, etc.). The network state information 275 can include actions the client device 220 takes in response to an action query. The network state information 275 can also indicate which client devices 220 are in standby states while waiting for another client device 220 to select an action. In some implementations, if multiple hands are being controlled by a player via the client device 220 for a single play of a card game (e.g., multiple hands for a single round of blackjack, poker, or another card game, etc.), the network state information 275 can include state information for each of the hands under control of the player. In addition, the network state information 275 can include information relating to the conditions of additional wagers.

In some implementations, the network state information 275 can include information relating to one or more plays of a poker game with community cards visible on a virtual table and hands associated with each player (e.g., each client device 220) in the network session 261. This information includes card hands, the current cards dealt, the bets placed by players, and the outcome history (e.g., win or loss) of previous gameplays. The network state information 275 can also include whether the current play (sometimes referred to as a "round" or a "play" of the poker game) satisfies any predetermined bonus conditions (or game conditions) based on the outcome.

The storage 215 can store or maintain network instructions 280. The network instructions 280 may include various instructions for one or more network applications that may be accessed at/provided by the data processing system 205. The network instructions 280 may include instructions for modifying the network state information 275 for a given network session 261. The network instructions 280 may include instructions to receive, transmit, and/or generate one or more data structures 262. In some implementations, the network instructions 280 may include instructions that compare various values stored as part of the network state information 275 to one or more criteria 263. The criteria 263 may include thresholds, conditions, values, path information, or other comparison information used by one or more network applications provided by the data processing system 205. For example, the criteria 263 can include one or more security criterion. The security criteria 263 can include one or more conditions for assigning client devices 220 to network sessions 261 (e.g., location proximities, etc.). In another example, the criteria 263 can include one or more interruption criterion. The interruption criterion can indicate a threshold at which the client devices 220 can be determined to have a suitable network connection (e.g., low latency, high round trip time, etc.) or a poor network connection (e.g., high latency, high round trip time, etc.).

In some implementations, the network instructions 280 can include display/presentation instructions, which may specify various assets, network configuration information, or other information used to provide various network applications to the client devices 220. The network instructions 280 can include instructions to play various games (e.g., poker games). The network instructions 280 can specify one or more game events that occur in response to a particular game state. The network instructions 280 can include instructions to play a game from start to finish, for example, by streaming gaming content to each of the client devices 220 that initiate play of a particular game, or by executing the network instructions 280 and displaying content via a local display device. The network instructions 280 can be stored in one or more data structures that are indexed by a game name (e.g., blackjack, poker, rummy, craps, sic bo, Klondike, any other game, etc.). The network instructions 280 can be processor executable instructions that cause the data processing system 205 to provide one or more games to a client device 220 via a communication session.

In some implementations, the network instructions 280 can include artificial intelligence models (e.g., machine learning models, neural network, decision trees, ruled-based lookup table, etc.) that cause the data processing system 205 to play an opposing entity to a player of one of the games in the network instructions 280. For example, the artificial intelligence model can provide a simulated dealer in a blackjack game, a simulated player in a poker game, or other simulated players, dealers, or game entities. In some implementations, the network instructions 280 can include network instructions that allow a play of a game to progress with multiple hands. For example, in a multi-hand card game, the network instructions 280 can include instructions that accommodate multiple hands being controlled by a single player.

The network instructions 280 can include, or may include instructions for generating odds information, which can be stored as probability values of certain in-game events occurring. The odds information may further define one or more probability distributions that may be sampled to determine an outcome of one or more events in the game according to the network instructions 280. In some implementations, the odds information may be altered based on actions taken by the player, or the odds information can correspond to the likelihood of one or more outcomes (e.g., an expected value of player loss, an expected value of player win, etc.). For example, in poker games, the odds may define the probability of a player being dealt a specific hand, such as a royal flush or a full house. A paytable for poker games can specify awards associated with different hands, and the odds information provides the underlying probabilities for those combinations in some implementations.

The network instructions 280 can also cause the network state information 275 for a game to be updated as the game is played via a client device 220. For example, in some implementations, the network instructions 280 can update the odds information in response to an indication (e.g., as stored in the network state information 275, etc.) to participate in an additional bonus opportunity, such as a bonus play of the game, a separate bonus game, or a side wager or insurance bet that may result in an additional or alternative award. In some implementations, the network instructions 280 can include instructions for displaying graphical elements corresponding to the odds information, the network state information 275, or any other type of graphical user interface described herein.

In some implementations, where the network instructions 280 provide instructions for a game that implements a side wager, the network instructions 280 can specify the conditions under which the player is able to place the side wager and the conditions under which the player is to be awarded with awards according to a side wager when a corresponding side wager condition is met (e.g., at game termination, on player win, on player loss, etc.). Each of the components of the data processing system 205 can access, update, or modify the network profiles 270, the network state information 275, or the network instructions 280, to carry any of the functionalities described herein.

In some implementations, the network instructions 280 can provide instructions for a poker game with bonus features. In a brief overview of the example network instructions 280, the data processing system 205 can generate a graphical user interface displaying a poker table with various bonus features. These bonus features may be defined as conditions or events that, when triggered by certain card combinations or player actions, can result in different payouts, bonus awards, or other in-game conditions. A round of poker (e.g., a play of the poker game) may conclude when the final betting round is completed, and the players reveal their hands. If the player's hand matches a winning combination, the data processing system 205 can dynamically update the graphical user interface to reflect an award amount and a bonus value corresponding to the bonus feature(s). Throughout the poker game, the data processing system 205 can dynamically update the graphical user interface to reflect any changes in the network state information 275.

In some implementations, the network instructions 280 can provide instructions for assigning network sessions 261. The network instructions 280 can specify security criterion to be satisfied for each client device 220 to be assigned to a network session 261. For example, the security criterion can define standards that each client device 220 must meet to be assigned to a network session 261. The security criterion can be based on the client device that the data processing system 205 is assigning to a network session 261 and a set of client devices that has been assigned to the network session 261. In some examples, the security criterion can be associated with location information. In these examples, the security criterion can define threshold distance that the client device must satisfy between each client device in the set of client devices to be assigned to the network session 261. Users of client devices 220 that are near each other may be able to discuss aspects of the network session 261 (e.g., collude within the poker game), which can compromise the security of the network session 261. The network instructions 280 can include instructions for determining whether each client device 220 satisfies the security criterion and assigning each client device 220 to a network session 261. For example, the user instructions 280 can provide instructions for identifying a second network session in response to determining that the first network session does not satisfy the security criterion.

In some implementations, the network instructions 280 can provide instructions for modifying graphical user interfaces based on latency of the client devices 220. For example, the network instructions 280 can include instructions for determining network latency information associated with client devices 220. The network latency information can indicate a time between transmission of data from the data processing system 205 to each client device 220. The time can be determined based on an acknowledgement transmitted by each client device 220. The network latency information may indicate that a client device 220 has a poor network connection. As an example, latency above a threshold amount of time can indicate that the client device has a poor connection. Alternatively, latency may indicate that a client device 220 has a good (e.g., acceptable) network connection. In some examples, the network instructions 280 can include instructions for determining the quality of the network connection between each client device 220 (e.g., a threshold amount of time). In these examples, there may be multiple thresholds indicating multiple qualities of network connections (e.g., poor, acceptable, and good).

The instructions for modifying graphical user interfaces provided to each client device 220 can be based on the determination of the quality of the network connection. For example, the network instructions 280 can provide instructions for reducing the file size of graphical user interfaces based on determining a client device 220 has a poor network connection. The network instructions 280 can provide instructions for removing graphical elements, replacing certain graphical elements with alternative graphical elements, compressing images, compressing code associated with the graphical user interface, presenting alternative graphical interfaces, foregoing presentation of certain graphical interfaces, and/or the like to reduce the file size of the graphical user interface and/or the amount of information to be transmitted to the client device 220. Similarly, the network instructions 280 can provide instructions maintaining or increasing the file size of graphical user interfaces based on determining a client device 220 has a good network connection. The network instructions 280 can provide instructions for transmitting a default graphical user interface or adding elements to the graphical user interface such as higher resolution images, animations, audio files, and/or the like to maintain or increase the size of the graphical user interface.

Referring now to the operations of the data processing system 205, the device communicator 230 can establish a network session 261 (sometimes referred to herein as a game session) with a client device 220 in response to a request from the client device 220. Establishing the network session 261 may include generating network state information 275 for the network profile 270 used to access the data processing system 205 to initiate the play of the game. The request to establish a game session may include a request to play a game, which may be received in one or more messages from an application executing on each client device 220. The message, or request, can indicate that a player intends to play a game provided by the data processing system 205. The message can include an indication of a network profile 270 with which to use for the functionalities related to the game (e.g., placing wagers using earned credits, purchasing additional credits, etc.).

The message can include an identifier of a particular game to play. In some implementations, the device communicator 230 can provide the client device 220 with instructions to display one or more games to play in a list, allowing the player to select a game from the list. In response to an interaction indicating a selection, the client device 220 can transmit a signal identifying a game to the data processing system 205. Using the selection, the data processing system 205 can communicate a user interface for the game generated according to the game instructions 280 for the game and the network state information 275 for the game session. Such graphical user interfaces are shown in FIGS. 3A-3D.

The data processing system 205 can assign a network session 261 to the client device 220 based on the request. For example, the data processing system 205 can identify a network session of a plurality of network sessions 261 to which a client device 220 and/or associated network profile 270 is to be assigned. The plurality of network sessions 261 may be a plurality of network sessions that have not yet been initiated. In an example, the plurality of network sessions 261 may be assigned a set of client devices that are in a standby state waiting for the network session 261 to begin. The data processing system 205 can determine whether a network session 261 satisfies security criterion. The security criterion may be associated with an attribute (e.g., location) of the client device 220. In an example, the security criterion may compare the attribute of a client device to determine if the attribute of the client device and the set of client devices satisfies the security criterion. In response to determining that the client device satisfies the security criterion, the data processing system 205 may assign the client device to the network session 261. In some implementations, in response to determining that the client device does not satisfy the security criterion, the data processing system 205 may identify a different network session 261 and repeat the process. In some examples, the security criterion may be associated with location information. For example, the security criterion may specify a minimum threshold distance for client devices 220 to be separated by to satisfy the security criterion.

The data processing system 205 can determine location information for client devices 220. For example, the data processing system 205 can determine location information of a client device 220 based on the request to access a network session 261. The location information can be determined from an identifier (e.g., internet protocol (IP) address, service set identifier (SSID), cellular tower information, and/or the like) associated with the request. As an example, the request transmitted to the data processing system 205 may include a header indicating the identifier. In another example, the data processing system 205 may determine location information in response to the client device 220 accessing the network application. In this example, the client device 220 may transmit access data to the data processing system 205 to access the network application. The access data may be credentials (e.g., username and password, biometrics data, and/or the like) associated with a player profile 270 and/or the network application. Based on the transmitted data, the data processing system 205 may determine location information for the client device 220. For example, the transmitted data can include an identifier (e.g., as a header of the access data) that indicates a location of the device. In described examples, identifiers can indicate a physical location of the client device 220 or physical infrastructure associated with the network connection of the client device 220. As an example, cellular tower information can indicate a physical location of a cellular tower through which the client device 220 transmitted data to the data processing system 205. In this example, the location information of the client device 220 can derived from location information obtained from one or more cellular providers (e.g., triangulation data, etc.). In an example, the data processing system 205 can transmit a request for the location information to a computing system (e.g., external system) including at least part of the request to join a network session 261 submitted by the client device 220 (e.g., the identifier included in the header). In this example, the computing system can return location information associated (e.g., latitude and longitude coordinates, city, zip code, and/or the like) with the client device 220.

The data processing system 205 can provide various types of network applications to the client devices 220 via one or more network sessions 261. The application(s) may be selected via one or more user interfaces with which a user can interact to modify network state information 275. In some implementations, the game can a card-based game, which can include (but is not limited to) poker, blackjack, rummy, or other similar games, a slot machine game, a game of chance, a grid-based game, a navigation game, among other types of games/applications. Furthermore, in some implementations, the game can be a dice-based game, which can include (but is not limited to) a game of craps, sic bo, or Klondike.

A play of a game can be a single "round" or play-through of a game to a termination condition (e.g., a condition after which the player has won or lost the wagers for a single instance of the game, etc.). To initiate a play of the game, or during a play of the game, the device communicator 230 can receive one or more network communications/requests that include data structures 262 specifying wagers from the client device 220 (e.g., in response to corresponding user interface elements presented at the client device 220, as described herein). The wager(s) may specify a wager amount. The wager amount provided by the client device 220 can be a specified amount of credits, such as 2, 5, 25, 200, 500, or 2000 credits. In some implementations, the player can specify a custom number or fractional number of credits used in the game, each of which may correspond to a respective condition, outcome, or aspect of the game. In some implementations, the wagers may include side wagers, additional wagers, or other wagers placed prior to or during a play of the game. The game may proceed to the next "round" based on receiving input (e.g., a wager) from a threshold number of players in the game.

The client device 220 (or an application executing on the client device 220) can receive data relating to the requested game from the device communicator 230. The data relating to the requested game can include or may be generated based on network state information 275, which can be maintained by the state manager 240, as described herein. The device communicator 230 may determine updated information to provide to the client device 220 based on the network state information 275 for the game, which is initialized and updated by the state manager 240.

The device communicator 230 may generate network latency information for one or more client devices 220 based on communications from the one or more client devices 220. The network latency information can indicate the time elapsed between transmission of data by the device communicator 230 and acknowledgement of data by each client device 220. In an example, the device communicator 230 may transmit data to a client device 220. The client device 220 may return an acknowledgement based on receiving the data. The acknowledgement can be a small data packet that indicates a transmission has successfully been received, which the client device can transmit to the device communicator 230 based on receiving the data. The device communicator 230 may determine the elapsed time between transmission of the data and receipt of acknowledgement to the data. In an example, the data can be a request. For example, the data can be a request for information from the client device 220. In this example, the client device may transmit a response to the request (e.g., after the acknowledgement). The response can include input that a player has provided to the client device 220 in response to the request.

The state manager 240 updates and maintains the network state information 275, which may refer to the current state of one or more network applications described herein. In some implementations, the network state information 275 can maintain a state of a card game, a slot machine game, or a roulette game, including the current state of the roulette wheel, the bets placed by player(s), the payout odds for each bet, the active bonus regions, and the outcome history of previous spins. The state manager 240 can maintain the outcome of each gameplay (e.g., win or loss) and whether the current play satisfies any predetermined bonus conditions based on the outcome. The state manager 240 can update the network state information 275 based on player interactions and network instructions 280. For example, the state manager 240 can update the network state information 275 when the player folds their hand, changes their bet on the round, and/or the like. Similarly, the state manager 240 can update the network state information 275 based on events of the network application, such as a reveal of community cards.

The profile manager 250 can create, modify, or delete network profiles 270 stored within storage 215. The profile manager 250 can store and organize player information, including account details, preferences, and gaming history, among others. The profile manager 250 can generate profile information based on data received from the client devices

220. This allows the profile manager 250 to capture activity across different gaming applications and different devices, and store records of that activity in the network profile 270. The profile manager 250 can provide gaming statistics (e.g., historical game outcomes), and game progress to a requesting client device 220.

The profile manager 250 can update credit balances, game statistics, and other relevant information based on the outcomes of games played by a client device 220. The profile manager 250 can receive data about game results from the client devices 220 or the state manager 240 and use this information to make adjustments to the network profile 270. For example, if a player wins a roulette game with a $10 wager, the profile manager 250 can increase the credit balance of the corresponding network profile 270 by an award amount (the amount of the wager plus any amount won from the roulette game). Similarly, the profile manager 250 can record game statistics such as the number of wins, losses, and ties, as well as the player's average bet size, win percentage, and longest winning streak. This allows players to track their progress and review their gaming history.

In some examples, the profile manager 250 can maintain location information associated with the client devices 220 as part of the network profiles 270. For example, the data processing system 205 can periodically determine location information of client devices 220. The location information can be determined at regular intervals of time (e.g., every day) and/or based on actions submitted by client devices 220 (e.g., request to access network session, accessing network application, changing accounts details, and/or the like). In an example, the location information maintained by the profile manager 250 may be used to determine if a client device satisfies the security criterion of a network session 261 with reference to a set of client devices assigned to the network session. In some examples, the profile manager 250 can similarly maintain network latency information associated with the client devices 220 as part of the network profiles 270. As an example, the data processing system 205 can determine whether client devices 220 satisfy an interruption criterion (e.g., based on determining a network session has stalled). In this example, the profile manager 250 can maintain network latency information associated with client devices 220 based on the determinations of the data processing system 205 with respect to the interruption criterion. The network latency information maintained in the network profiles 270 can be used to provide data including graphical content to client devices 220 in subsequent network sessions. In an example, the network latency information can be updated periodically. For example, the data processing system 205 can periodically reevaluate client devise 220 that have been determined to satisfy the interruption criterion, and the profile manager 250 can update network profiles 270 accordingly.

Although the foregoing has been described in a client-server arrangement, it should be understood that in some implementations, the data processing system 205 may locally execute one or more of the network applications. In such implementations, player profiles 270 may be maintained and/or accessed via one or more remote servers via the network 210. In such implementations, the data processing system 205 can include one or more display devices to present various graphical user interfaces described herein, as well as any suitable input device (e.g., buttons, switches, actuators, etc.) to receive input to interact with the applications provided via the data processing system 205. In some implementations, the data processing system 205 can include one or more physical receptacles, which may receive physical wager items (e.g., cards, chips, tokens, etc.) to enable users to provide wagers for various game applications provided via the data processing system 205.

Referring now to an example implementation of a poker game, the data processing system 205 can receive a request to join a network session 261 of an electronic poker game from a client device. Network sessions 261 can function as virtual poker tables, allowing assigned client devices 220 to play poker together. The network sessions 261 can be at various stages of progress. For example, after a network session 261 is created, it may be pending initiation. Network sessions may be initiated based on satisfying initiation conditions (e.g., being assigned a threshold number of client devices, satisfying a threshold time from creation, and/or the like). After a network session is initiated, it may be an active network session until certain conditions have been met (e.g., the game of poker has ended). Once these conditions have been met, the network session may be terminated. In an example, the data processing system 205 can select a first network session of electronic poker associated with a group of client devices based on the request to join a network session 261. The data processing system 205 may select the network session from a group of network sessions that are pending initiation. In some examples, there may not be any suitable network sessions within this group. For example, there may not be any network sessions that have not been initiated, have room for an additional player, satisfy the security criterion, and/or the like. In some examples, the data processing system 205 can create a new network session based on determining that there are currently no suitable network sessions that the client device 220 can be assigned to. As an example, the data processing system 205 can create a new network session based on determining that none of the network sessions that are pending initiation satisfy the security criterion.

In response to selecting a network session, the data processing system 205 can then determine location information of the client device based on a part of the request to join a network session 261 and compare it to location information of the group of client devices. The data processing system 205 can select a second network session based on determining that the location of the client device is too close to another client device in the group of client devices. The data processing system 205 can receive a wager and generate a graphical user interface presenting a poker table with various card hands assigned to other client devices in the group of client devices. The data processing system 205 can receive input from the client and update the graphical user interface based on the player's hand intersecting with the bonus feature(s) during the play of the poker game and resulting in a winning combination. The graphical user interface can be updated based on the network connection of each client device 220. For example, the data processing system 205 can determine a network connection quality of client devices 220 based on network latency information. The network latency information can include a latency value of one or more transmissions to client devices. The latency value can be the time between when the data processing system 205 transmits data and receives an acknowledgement from client devices. In some examples network latency information can include other indicators of network connection quality such as packet loss, jitter, error rate, and/or the like. The data processing system 205 may be associated with an interruption criterion that indicates a threshold value at which the client devices are considered to have high latency or low latency. For example, the data processing system 205 can determine that a client device has low latency (e.g., a good network connection) based on the client device being associated with a latency value (e.g., of a single communication, average latency value of communications over a preset period, and/or the like) that is below the threshold of the interruption criterion. Similarly, the data processing system 205 can determine that a client device has high latency (e.g., a poor connection) based on the client device being associated with a latency value that satisfies the interruption criterion. In an example, a client device 220 with low latency can receive a different graphical user interface than a client device with high latency. For example, the graphical user interface transmitted to the client device with low latency can have a larger file size than the graphical user interface transmitted to the client device with high latency. The file size of graphical user interfaces can be changed by removing graphical elements and/or simplifying graphical elements of the graphical user interfaces. Example graphical user interfaces showing an example implementation of a poker game are shown in FIGS. 3A-3D.

Figure 3A:
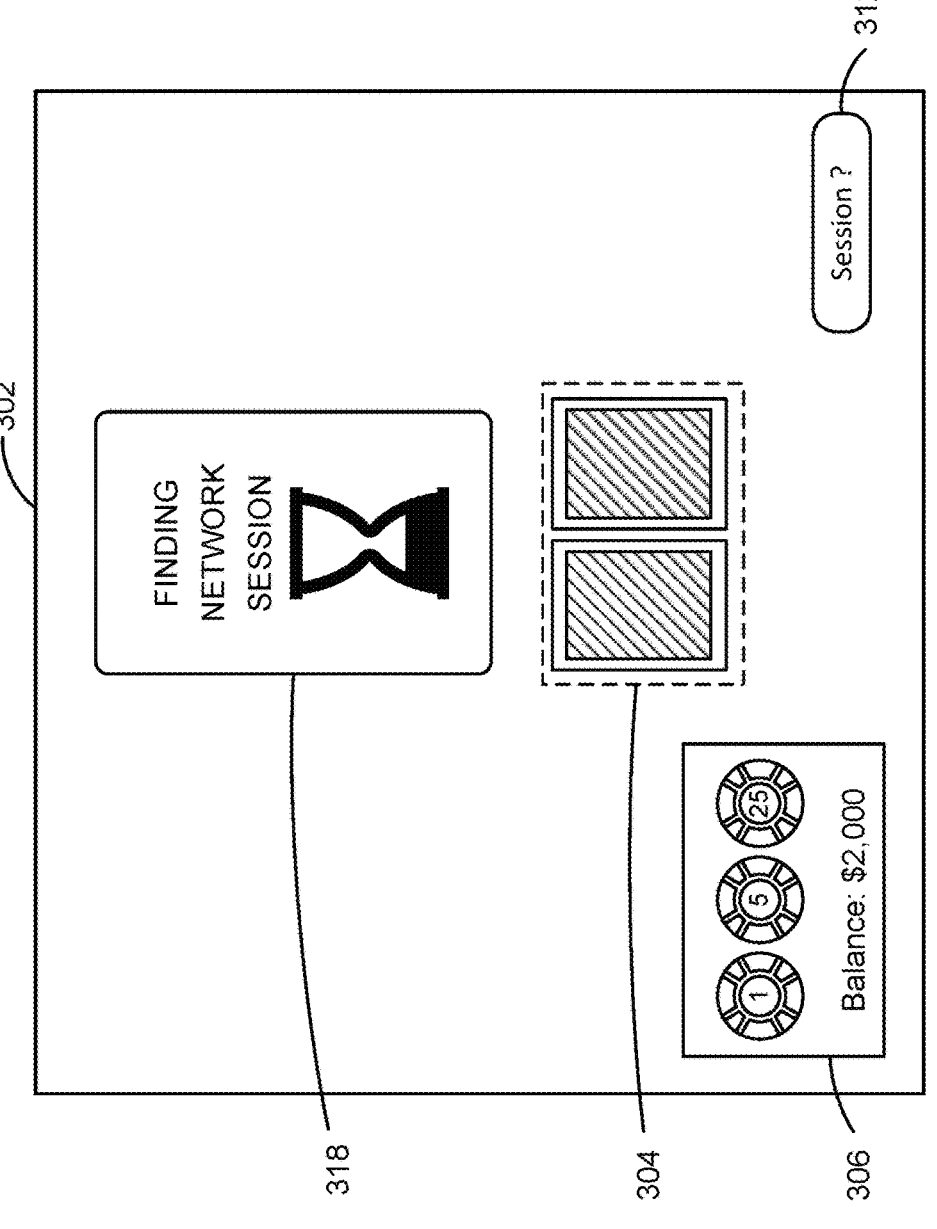
FIGS. 3A, 3B, 3C, and 3D depict example diagrams of graphical user interfaces that may be displayed in connection with protected network sessions, in accordance with one or more implementations.

Referring now to FIG. 3A in the context of the components described in connection with FIGS. 1A-D and 2, a graphical user interface 302 is presented on a client device for finding a network session for a poker game. For example, the client device may be a client device from the client devices 220, such as client device 220a. In this example, other client devices 220 may also be assigned to other network sessions 261. As discussed above, the device communicator 230 can facilitate communication between the client devices 220 and the data processing system 205, allowing players to interact with a graphical user interface 302 and transmit their actions to the data processing system 205. As players engage (e.g., via client devices 220) with the graphical user interface 302, their actions, such as requests to join a game, may be captured and stored in their network profile 270.

As depicted in FIG. 3A, the graphical user interface 302 displays a visual representation of a loading symbol 318. The loading symbol 318 can include text (e.g., "FINDING NETWORK SESSION") and/or a symbol (e.g., hourglass symbol) indicating that the data processing system is assigning the network session. The graphical user interface 302 displays a session identifier 312 that indicates the network session has not yet been assigned. In an example, the session identifier 312 may be updated to include an identifier of the network session (e.g., in place of "?") once the network session has been assigned. The graphical user interface 302 displays a bankroll 306 indicating the amount of money that the player has available to wager during a network session of poker (e.g., $2,000). In an example, the graphical user interface 302 can include an interactive element corresponding to a buy-in amount of the poker game. In some implementations, cards of corresponding to a player hand 304 can be presented using face-down graphical elements before the network session has been assigned.

In some implementations, the graphical user interface 302 can indicate the loading symbol 318 in response to a request to join a network session of poker transmitted by the client device 220a. For example, the player can submit (e.g., via client device 220a) a request to join a network session of poker. The request may be a request to be assigned to a network session to be selected by the data processing system 205. The data processing system 205 may select a network session (e.g., candidate protected network session) from a group of available network sessions. The available network sessions can be network sessions for which the poker game has not yet started. In some implementations, the data processing system 205 may determine whether a selected network session satisfies one or more security criterion. The security criterion may define a condition for compatibility of the client device 220a and a group of client devices assigned to the network session. For example, the rules may define a threshold distance that the client device 220a is to be from other client devices that are already assigned to the network session. The data processing system 205 can determine whether the client device 220a satisfies the security criterion based on comparing an attribute of the client device 220a to the group of client devices assigned to the network session. For example, the attribute may be location and the client device 220a may be determined to be compatible with the group of client devices assigned to the network session based on being a threshold minimum distance away from each client device in the group of client devices.

In some implementations, the location of the client device and other client devices assigned to the network session may be determined based on the request to join a network session. For example, it may be determined based on an identifier (e.g., IP address) included in the request. If the client device 220a does not satisfy security requirement, the data processing system 205 can identify a new network session and determine if the new network session satisfies the security criterion. This process can be repeated until the data processing system 205 identifies a network session for the client device 220a that satisfies the security criterion. In some implementations, if no suitable existing network session can identified, the data processing system 205 can generate a network session, to which the client device 220a (or the player profile 270 thereof) can be assigned. Once a network session that satisfies the security criterion has been identified for the client device 220a, the data processing system 205 may assign the client device 220a to this network session.

In some implementations, the data processing system 205 can update the graphical user interface 302 based on assigning the client device 220a to a network session. Updating the graphical user interface 302 can include removing the loading symbol 318 and updating the session identifier 312 to include a session identifier of the network session. In some implementations, the client device 220a may be assigned cards based on being assigned to a network session. In these implementations, the player hand 304 can be updated to display the cards that have been assigned to the client device 220a.

Figure 3B:
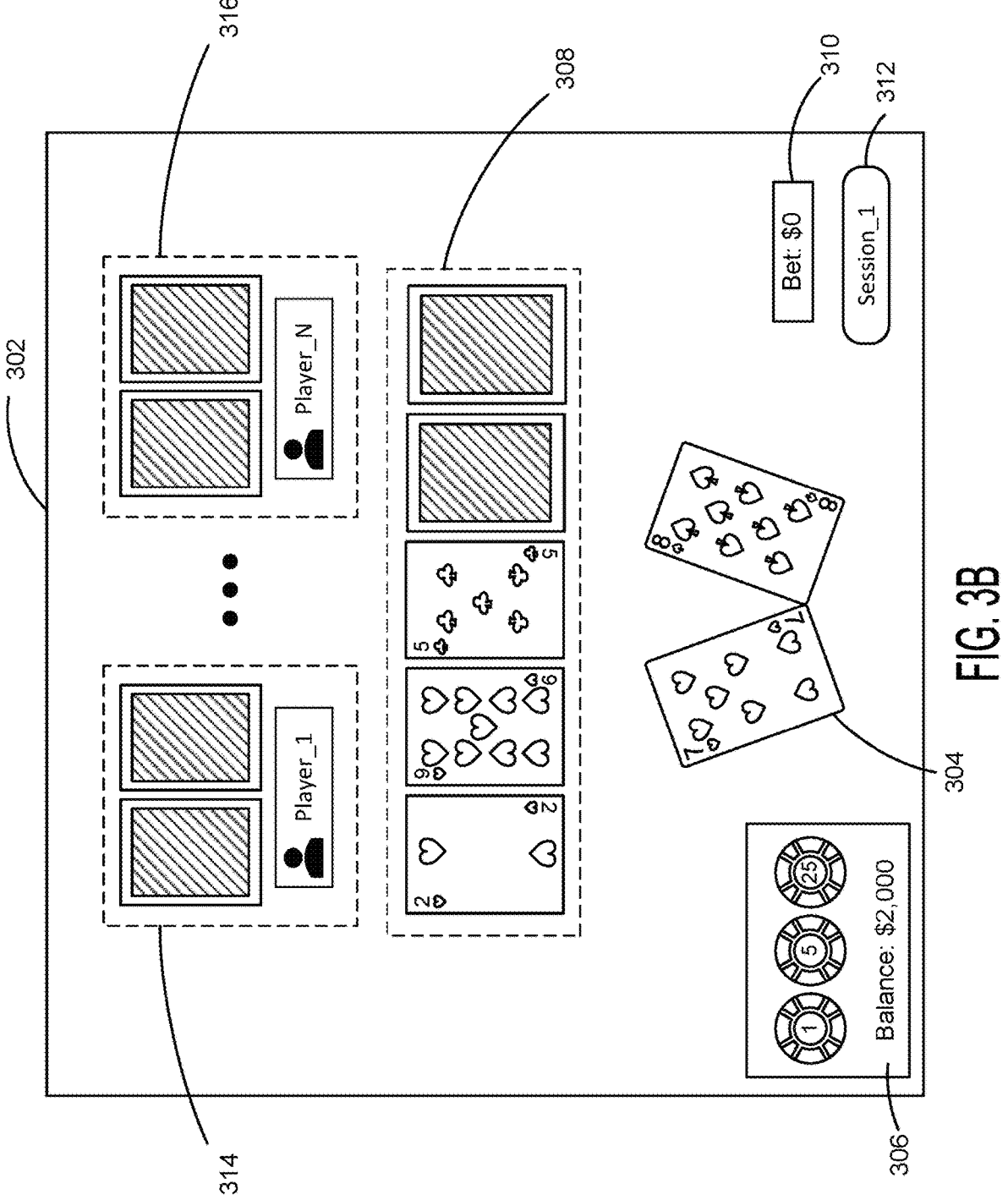

Referring now to FIG. 3B, in the context of the components described in connection with FIG. 2, an updated graphical user interface 302 is presented on the client device 220a in response to assigning the user to a network session. The graphical user interface 302 displays a group of client devices (e.g., players) assigned to the network session including player 1 314 and player N 316. Each client device can be associated with a hand of cards that is not visible to the client device 220a presenting the user interface 302. Each client device can be associated with a network profile identifier that identifies the associated player, such as a player number or a player username (e.g., "Player 1"). The graphical user interface 302 displays a set of community cards 308. The community cards 308 can include five cards that are incrementally revealed. The graphical user interface displays a bet region 310. The bet region 310 can indicate a wager amount input by the client device 220a. Similar to the graphical user interface 302 displayed in FIG. 3A, the graphical user interface may display information unique to the client device 220a, such as the player hand 304 and the bankroll 306.

In some implementations, the graphical user interface 302 can display a network session for an electronic poker game. In some implementations, the poker game may be a Texas Hold Em' style poker game where there the community cards 308 include five community cards that are revealed in three stages. In the first stage, three cards are revealed, in the second stage a fourth card is revealed, and in the third stage the fifth and final card is revealed. At each stage, the data processing system 205 may receive input from each client device assigned to the network session. For example, each client device may transmit an action (e.g., betting, calling, raising, folding, checking, and/or the like) based on the card that has been revealed and/or actions of other players. The data processing system 205 may request input from each client device in an order that is determined before the start of the poker game and/or during the poker game. For example, the data processing system 205 may request input from a first client device and then request input from a subsequent client device until all client devices assigned to the network session have submitted input for a stage. In an example, the client device 220a may submit delayed responses due to network latency. In this example, the data processing system 205 may modify the graphics data provided to the client device 220a based on determining that the client device 220a is not responding. The modified graphics data may include fewer features than the original graphics data and/or features with a smaller file size. For example, the modified graphics data may include static features in place of animated features.

In some implementations, graphical elements in the graphical user interface 302 may be displayed when it is not the turn of the client device 220a to take an action. For example, the graphical user interface may be displayed when the data processing system 205 is waiting for another client device, such as a client device associated with player 1 314 or player N 316, to transmit input indicating an action. In some implementations, the graphical user interface 302 may be updated based on the actions of the group of client devices assigned to the network session. For example, the graphical user interface 302 can be updated to show that a client device has transmitted an action such as folding, raising, and/or the like.

In some implementations, the graphical user interface 302 may request input from the player. For example, when it is the player's turn in a stage to submit an action, the graphical user interface 302 may display a graphical element prompting the user to submit input including an action selection. In some implementations, the graphical user interface 302 may display a request for input from the user based on an action taken by another user. For example, in response to another user submitting a raise to the current bet amount as their action, the player may be prompted to submit a response (e.g., match the new bet, raise it further, or fold).

In some implementations, the data processing system 205 may retrieve and/or determine network latency information from each of the assigned client devices of a network session. For example, network latency information may be based on network communications received from the client devices. The network latency may indicate the time delay experienced in data transmission between the client devices and the server. Based on determining that the network latency of a client device satisfies interruption criterion, the data processing system 205 may selectively provide modified graphical content. The modified graphical content can include modified graphical items (e.g., icons, text, animations, backgrounds, and/or the like). For example, the modified graphical items can include graphical items that have a smaller file size, and therefore use less bandwidth to transmit (e.g., static graphical items instead of animated graphical items). As another example, modifying the graphical content can include removing graphical items.

Figure 3C:
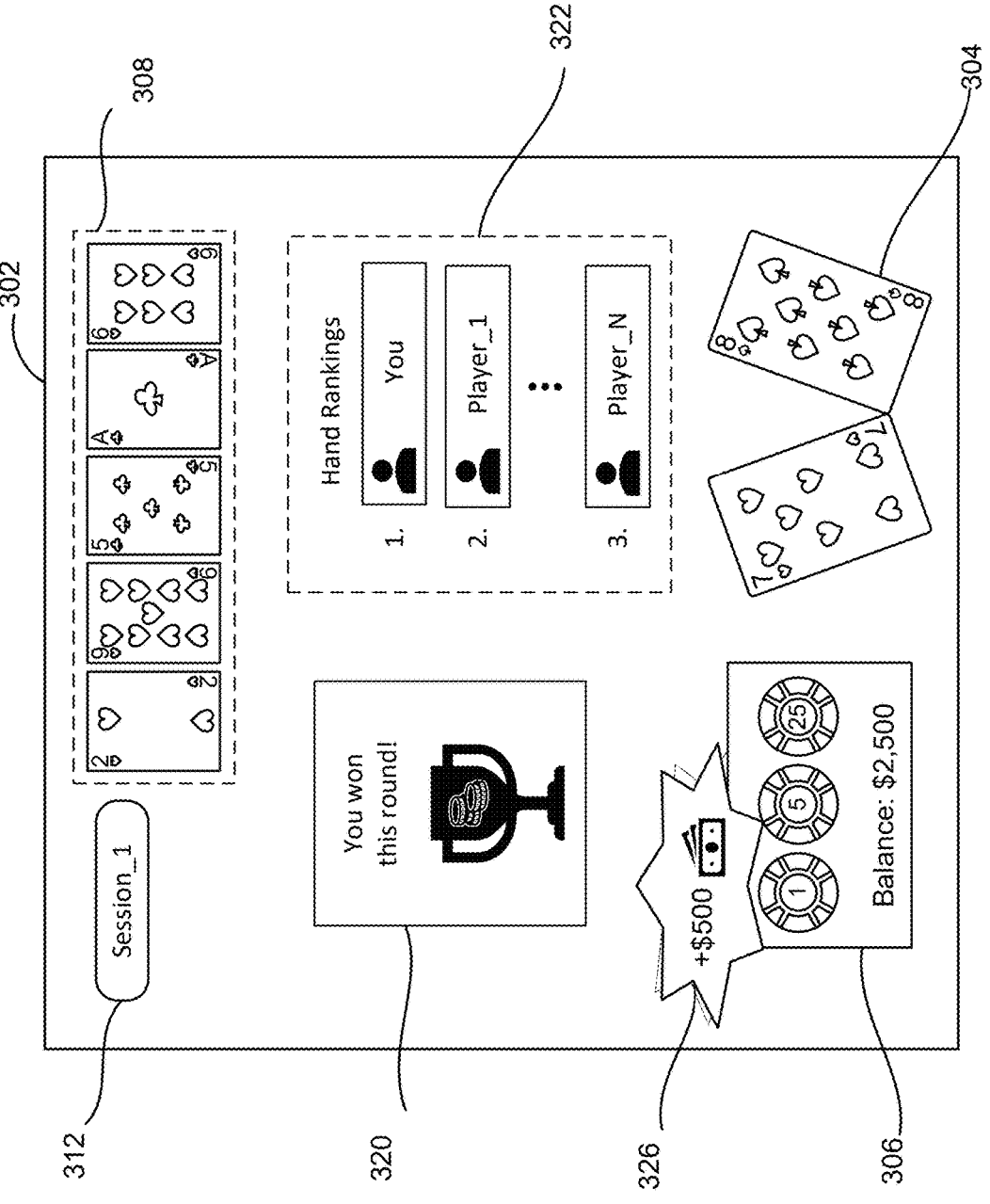

Referring now to FIG. 3C, in the context of the components described in connection with FIG. 2, an updated graphical user interface 302 is presented on the client device 220a in response to determining that the client device does not satisfy an interruption criterion. The graphical user interface 302 displays the community cards 308 that have all been revealed. The hand rankings of the players (e.g., group of client devices) are determined based on the community cards 308 and displayed in the hand rankings display 322. It is determined based on these hand rankings that the client device 220a has the highest ranked hand, therefore winning the network session. The congratulations icon 320 displays a congratulations message to the client device 220a for winning the network session (e.g., round of poker). The animated balance change icon 326 shows the client device 220a's winnings from the pot. Similar to previously discussed graphical user interfaces, the graphical user interface also displays a session identifier 312 and the player hand 304.

In some implementations, the graphical user interface 302 may be displayed after the final set of input has been transmitted by the group of client devices. For example, the graphical user interface 302 may be displayed after all of the players have submitted input including an action (e.g., bet, call, raise, and/or the like) based on the fifth card of the community cards 308 being revealed. The graphical user interface may be displayed when the player associated with the player hand 304 has the highest ranking.

In some implementations, the hand rankings in the hand rankings display 322 may be based on standard poker rules. In some implementations, additional bonus rankings from one or more bonus tables may be used in determining an outcome of the electronic poker games described herein. From a group of seven cards including the five community cards 308 and the two cards of a client device, the data processing system 205 can determine if there are any combinations that are considered valuable. Valuable combinations can include hands such as a royal flush (e.g., an ace, king, queen, jack, and ten of the same suit) or a straight flush (e.g., five consecutive cards of the same suit). Based on standard poker rankings of the highest value combination in the group of cards including the community cards 308 and the two cards of a client device, that client device may receive a ranking. As an example, the client device 220a may be ranked first based on determining that the straight (e.g., five consecutive cards of different suits) included in the player hand 304 and the community cards 308 is higher than any combination present in the hand of "Player_1", "Player_N", or any other client device assigned to the network session.

As a result of winning (e.g., being ranked highest, etc.) for the network session, the client device 220a may receive an award. The award may include credits associated with wagers places by the client devices (e.g., the pot). The value of the pot may be determined based on wagers that client devices have placed during the network session. As depicted, the amount of the pot may be indicated by the animated balance change icon 326. The animated balance change icon 326 may be an animated icon. For example, the animated balance change icon 326 may move within the graphical user interface 302. The movement may include tilting about the origin, moving and returning, changing in size, and/or the like. This movement may persist for the duration that the animated icon is on the graphical user interface 302.

In some implementations, the data processing system 205 may display the graphical user interface 302 based on the network latency information. For example, the graphical user interface may be displayed based on determining that the client device 220a does not satisfy interruption criterion (e.g., has a good network connection). The data processing system 205 may generate network latency information for each client device indicating a time delay between transmission and receipt of information between the client device and the data processing system 205. This network latency information can be based on the time delay between transmission and receipt of requests for user input of actions to the client device and/or transmission of user input indicating an action to the data processing system 205. The data processing system 205 may present the graphical user interface 302 based on determining that the network latency information does not satisfy the interruption criterion.

In an example, the data processing system 205 can modify graphical elements of the graphical user interface 302 based on this determination. For example, the data processing system 205 can display alternative graphical elements in the graphical user interface that are associated with a greater size (e.g., relatively larger amount of data, file size, etc.). Such graphical user interfaces may include higher-resolution graphical elements, animated elements, three-dimensional graphics, and/or the like. Such higher file-size graphics can be displayed in place of lower resolution and/or alternative graphical elements. As an example, the data processing system 205 can display the animated balance change icon 306 in place of a static balance change icon. Additionally, or alternatively, the graphical user interface 302 can include more graphical elements (e.g., than a graphical user interface presented to a client device that does satisfy the interruption criterion). For example, the graphical user interface 302 can include graphical elements such as the congratulations icon 320. Graphical elements that are removed or added based on the interruption criterion can be graphical elements that enhance the graphical user interface (e.g., aesthetics of the graphical user interface, usability, and/or the like), but are not critical to the progression of the network session. Critical graphical elements can include requests for user input, graphical elements that include important information about the progress of the game (e.g., that is not displayed elsewhere), and/or the like.

In some implementations, the data processing system 205 may determine whether to display the graphical user interface 302 or present a modified graphical interface that includes elements that use less bandwidth based on the state information of the network session. For example, in response to determining, based on the state information, that the game has stalled and/or may stall due to poor connectivity/network connection quality of at least one client device, the data processing system 205 may determine if any of the client devices satisfy the interruption criterion. The state information can indicate at what stage the network session is, which client device's turn it is to respond, and/or how long it the network session has been at the current stage. The network latency information for each client device can indicate a delay between transmission of a request for user input and receipt of a response. Based on determining that the network session has stalled, the data processing system 205 may determine whether the client device 220a satisfies the network interruption criterion (e.g., based on the network latency information of the client device). In an example where the client device 220a does not satisfy the interruption criterion (e.g., shows low network latency), the data processing system 205 may present the graphical user interface.

In some implementations, the client device 220a may satisfy the interruption criterion due to poor network connection. This may, for example, be due to location of the client device 220a. Certain locations may have poor signal due to obstructions, distance from the network source, or interference from other electronic devices. Other factors such as network congestion or hardware limitations can also cause poor network connection. Poor network connection can impede the speed of transmission of data to and/or from client devices. As a result of poor network connection, the state of the network session can stall due to slow response time from the client device 220a due to a poor network connection.

Figure 3D:
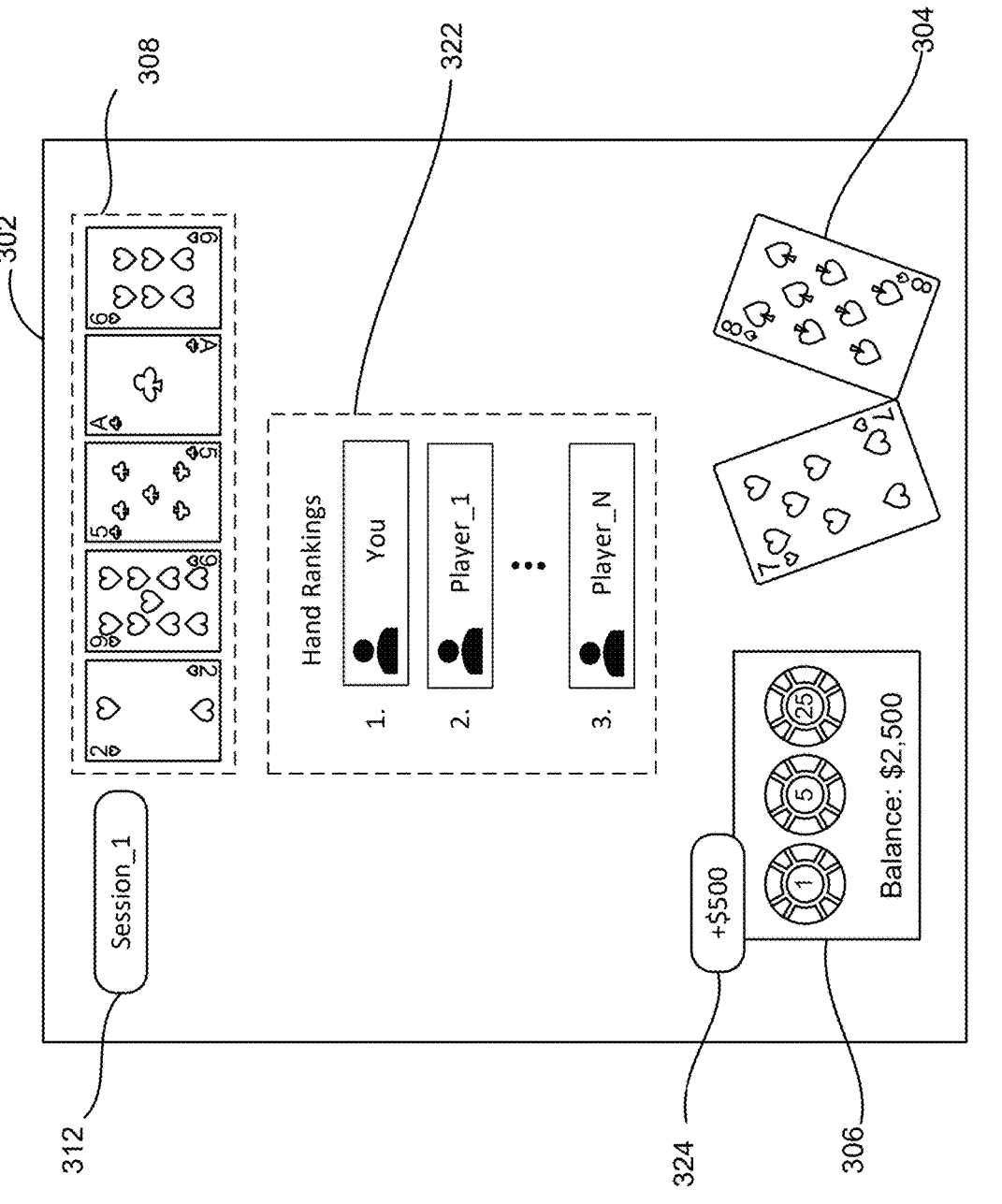

Referring now to FIG. 3D, in the context of the components described in connection with FIG. 2, an updated graphical user interface 302 is presented on the client device 220a in response to determining that the client device 220a does satisfy an interruption criterion. The graphical user interface 302 displays similar elements to the graphical user interface 302 of FIG. 3C. However, the graphical user interface 302 does not display a congratulations icon (e.g., the congratulations icon 320 of FIG. 3C) and displays a static balance change icon 324 in place of the animated balance change icon (e.g., animated balance change icon 326 of FIG. 3C).

In some implementations, the graphical user interface 302 may represent a reconfigured version of an original graphical user interface (e.g., the graphical user interface 302 of FIG. 3C) that has a smaller file size and/or graphical elements that may not necessarily require retrieval from one or more servers (e.g., display using locally stored data, etc.). Removing and graphical elements and from a graphical user interface and/or replacing animated elements with static elements can reduce the amount of data that needs to be transmitted. This can result in faster updates of the graphical user interface 302 on the client device 220a, which can reduce latency.

In some implementations, some client devices may receive original graphical user interfaces (e.g., such as the graphical user interface 302 of FIG. 3C) or instructions to present such interfaces, while other client devices may receive reconfigured graphical user interfaces, such as the graphical user interface 302. Such graphical user interfaces may be presented in parallel and provide similar information to client devices. As an example, the client device 220a may receive the graphical user interface 302 while the other client devices may receive graphical user interfaces with animated elements and/or nonessential elements (e.g., such as the graphical user interface 302 o FIG. 3C) based on the client device 220a satisfying the interruption criterion while the other client devices do not satisfy this interruption criterion.

In some implementations, the original and reconfigured graphical user interfaces can require user input. In these implementations, reducing the file size of the graphical user interface presented to the client device 220a based on determining that it satisfies the interruption criterion can reduce latency in responses received from that client device 220a. A poor network connection can cause transmission times to increase exponentially, therefore adaptive reconfiguration of the data transmitted to a client device based on determining that the client device has a poor network connection can greatly reduce the latency of that transmission. Other client devices in a network session may be in a standby state when user input is requested from the client device 220a. This reconfiguration can also reduce the amount of time that other client devices are in a standby state waiting for the client device 220a to select an action.

Figure 4:
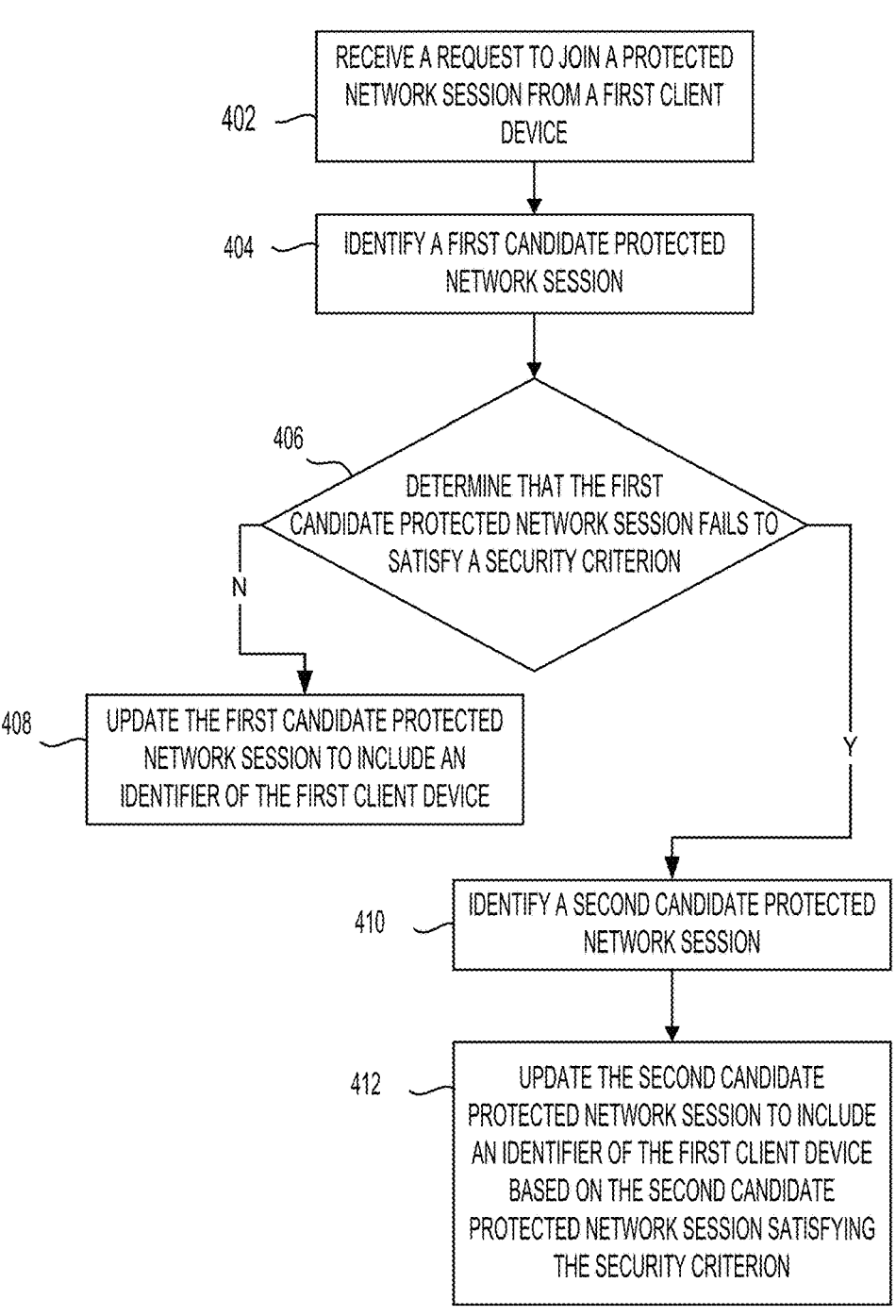
FIG. 4 illustrates an example flow diagram of a method for assigning protected network sessions for network applications, in accordance with one or more implementations.

Referring now to FIG. 4, depicted is an illustrative flow diagram of a method 400 for assigning protected network sessions for network applications. The method 400 can be executed, performed, or otherwise carried out by a data processing system. A data processing system (e.g., the data processing system 205) can be remote to one to one or more client devices and communicate with the one or more client devices via a computer network. In some implementations, the operations of method 400 can be performed by a standalone gaming device (e.g., without communicating with a gaming server to perform the method steps). In a brief overview of the method 400, the data processing system can receive a request to join a protected network session (STEP 402), identify a first candidate protected network session (STEP 404), and determine whether that the first candidate protected network session fails to satisfy a security criterion (STEP 406) If the first candidate protected network session does not fail to satisfy the security criterion, the data processing system can update the first candidate protected network session too include an identifier of the first client devices (STEP 408). If the first candidate protected network session does fail to satisfy the security criterion, the data processing system can identify a second candidate protected network session (STEP 410) and update the second candidate protected network session to include an identifier of the first client device (STEP 412).

In further detail of the method 400, the data processing system can receive a request to access a protected network session from a first client device (STEP 402). The request may indicate that a player associated with the first client device intends to access one of a plurality of protected network sessions. For example, the data processing system can manage a plurality of protected network sessions. Protected network sessions may be network sessions that are protected by at least one security criterion that maintains integrity of activities of computing devices within the network session. The plurality of protected network sessions may be associated with a plurality of client devices. Protected network sessions can be associated with a network application where client devices may interact according to protocols of the network application. For example, the protected network session can be a session of an application that is an electronic game (e.g., electronic poker game). In this example, the protocols of the network application may include the rules for an interactive application (e.g., a remote desktop application, a SaaS application, an electronic game, etc.). The plurality of protected network sessions can be instances (e.g., sessions) of the network application that facilitate real-time or near real-time interaction among client devices assigned to the protected network session. A protected network session of the network application may facilitate real-time interactions among client devices (e.g., players) according to rules of the electronic game. For example, the electronic game may require submissions from client devices (e.g., bet, call, raise, and/or the like) to advance the electronic game. In some implementations, the electronic game may include an end-point at which the electronic game concludes (e.g., when poker hands are revealed, and the winner takes the pot). The protected network session may end at the conclusion of the electronic game.

Upon receiving the request, the data processing system can identify a first candidate protected network session of the plurality of protected network sessions (STEP 404). The first candidate protected network session can identify a subset of the plurality of client devices. For example, the subset of the plurality of client devices can be assigned to the first candidate protected network session. The first candidate protected network session may include an identifier of each client device in the subset of the plurality of client devices. In some implementations, the first candidate protected network session may begin based on being assigned a threshold number of client devices and/or satisfying a threshold time since the first candidate protected network session was initiated. As an example, the first candidate protected network session may start based on having a sufficient number of players (e.g., client devices) or the maximum number of players to play the associated game. For example, a network session of and electronic game of Texas Hold Em' can start based on the network session being assigned two client devices (e.g., the minimum) or ten client devices (e.g., the maximum).

The data processing system can determine whether the first candidate protected network session satisfies the security criterion based on comparing features of the first client device (e.g., location, device type, user profile features, internet connection type, and/or the like) with features of the subset of the plurality of client devices (STEP 406). For example, the data processing system may determine that the first client device fails to satisfy the at least one security criterion based on location information of the first client device and respective location information of each client device of the subset. The security criterion can include a threshold distance between client devices. In an example, the data processing system may determine that the distance of the location information of the first client device from the respective location information of at least one client device in the subset of the plurality of client devices fails to satisfy the at least one security criterion.

In an example, the data processing system can determine that the first candidate protected network session satisfies the security criterion. In this example, the data processing system can add the first client device to the first candidate protected network session in response to determining that the first client device satisfies the security criterion (STEP 408). For example, the data processing system can compare the location information of the first client device to the location information of other client devices in the subset of the plurality of client devices associated with the first candidate protected network. Based on this comparison, the first client device can determine that the first client device satisfies the security criterion. For example, the first client device may determine that the first client device satisfies (e.g., is at least) a threshold distance from the other client devices associated with the first candidate protected network session. The threshold distance may be a distance at which verbal communication between players associated with the client devices is not possible (e.g., 100 feet). In response to determining that the first client device satisfies the security criterion, the data processing system can assign the first client device to the first candidate protected network session. For example, the data processing system can update the first candidate protected network session to include an identifier of the first client device. In this example, the first candidate protected network session can start when it satisfies starting conditions, such as a threshold number of players. The first client device may then interact with the other client devices within the first candidate protected network session as part of an electronic game (e.g., of poker) for the duration of the network session.

In some implementations, the data processing system can determine that the first candidate protected network session fails to satisfy the security criterion. For example, the data processing system can compare location information of the first client device to location information of other client devices associated with (e.g., assigned to) the first candidate protected network. The location information can indicate locations of client device (e.g., latitude and longitude coordinates, and/or the like). In some examples, the data processing system can determine that the first client device is located within a threshold distance of at least one client device of the subset based on the comparison. The threshold distance can be the security criterion. The security criterion can provide a condition that maintains integrity of network sessions. For example, client devices that are within the threshold distance may communicate (e.g., in person) about the candidate protected network session, which can compromise the integrity of this candidate protected network session (e.g., electronic poker game). To mitigate this possible collusion, the data processing system can assign client devices to network protected sessions where the client devices is not within a threshold distance of other client devices of the network protected session. In an example, there may be multiple security criteria. For example, security criteria can be associated with network connection type, device type of client devices, user type in the network application, and/or the like). As an example, the client device may need to be transmitting information via a secure network and a threshold distance from other client devices assigned to the first protected network to satisfy the one or more security criterion.

In some implementations, the data processing system can be configured to determine the location information of the first client device based on the request to access one of the plurality of protected network sessions. For example, the data processing system can determine location information of the first client device based on interactions of the first client device with a network (e.g., the network 210 of FIG. 2). Methods such as internet protocol (IP) address geolocation, Wi-Fi triangulation, analyzing cellular network data, and/or the like may be used to determine the location information of the first client device. As an example, the data processing system may determine an IP address of the first client device in response to receiving the request. IP addresses can be unique numerical identifiers assigned to client devices within a computer network that can be used to manage communications (e.g., such as the request) over the computer network. In some examples, specific ranges of IP addresses can be mapped to geographic areas. In an example, the data processing system may determine location information based on a mapping between an IP address associated with the request and a physical location.

In some implementations, the data processing system may determine the location information from a computing system. For example, the data processing system can submit a request to the computing system to determine the location information of the first client device. The computing system may be an external system that can determine and/or maintain device locations based on input information. For example, the computing system can include a database with geographical locations associated with ranges of IP addresses from which the computing system can determine location information based on IP addresses. The request to determine location information can include device identifiers associated with the first client device (e.g., IP address, media access control (MAC) address, international mobile equipment identity (IMEI) number, Wi-Fi network information, and/or the like). Based on the identifying information, the computing system can return location information indicating a location of the first client device.

In some implementations, the location information can be determined based on a network associated with the request. For example, the request to access one of the network sessions can be transmitted over a network. The network can include a central hub (e.g., access point) that connects a set of devices (e.g., including the first client device), enabling them to communicate with each other and wirelessly access additional resources such as the internet. In some examples, the network can be associated with an identifier. The identifier can be a unique network identifier (e.g., service set identifier (SSID)) that allows devices to identify and connect to the network. In an example, the data processing system may determine the identifier of the network in response to receiving the request to join a protected network session from the device. In this example, the data processing system can determine location information based on the identifier. For example, the SSID can be associated with a central hub that has a physical location. In some examples, the data processing system can identify the physical location of the central hub associated with the SSID from a database, such as a database within the computing system. The database can include information about physical locations of central hubs associated with access points, such as latitude and longitude coordinates.

In some implementations, the location information can be determined based on a Haversine function. The Haversine function can determine the distance between two sets of coordinates on a sphere. For example, the Haversine function can determine the distance (e.g., curved distance along the outside of the sphere) between two sets of latitude and longitude coordinates. In some examples, location information may be determined for the first client device and the subset of the plurality of client devices associated with the first candidate protected network. In these examples, the location information can be determined based on a request from each client device to join a protected network session. The location information of a client device can be a set of coordinates identifying an approximate location of the device, such as a set of latitude and longitude coordinates. In some examples, the Haversine function can determine a distance between the first client device and each client device in the subset of the plurality of client devices assigned to a protected network session (e.g., such as the first candidate protected network session) based on these sets of latitude and longitude coordinates.

In response to determining that the first candidate protected network session does not satisfy the security criterion, the data processing system can identify a second candidate protected network session (STEP 410). For example, the data processing system can select the second candidate protected network session from the plurality of protected network sessions. In some examples, the second candidate protected network session may be evaluated. For example, the data processing system may determine whether the second candidate protected network session satisfies the security criterion. In response to determining that the second candidate protected network session does not satisfy the security criterion, the data processing system can identify a third candidate protected network session. This process can repeat until a candidate protected network session that satisfies the security criterion is identified.

The data processing system may assign client devices to candidate protected network sessions by updating the candidate protected network sessions to include identifiers of the client devices (STEP 412). For example, the second candidate protected network session can be updated to include an identifier of the first client device based on the second candidate protected network session satisfying the security criterion for adding the first client device. Candidate protected network sessions can be associated with a list of identifiers indicating client devices that are to participate in the candidate protected network session. The identifier can be an identifier associated with the network application (e.g., a username) or the client device (e.g., a phone number, and/or the like). In some examples, the identifier can be associated with an account of the network application. In these examples, actions of the client device within the candidate protected network session may affect the account. For example, winning the candidate protected network session may result in points (e.g., money, digital points, and/or the like) may be added to the account. Similarly, attributes of the account may affect potential actions available to the user of the client device. For example, points of the account may affect how much a client device can bet during a session of electronic poker. In some examples, candidate protected network sessions may be initiated after identifiers of client devices have been added.

In some implementations, the data processing system may initiate network sessions in response to determining that they include a threshold number of client devices. For example, the plurality of candidate protected sessions can be candidate protected network sessions that have not been initiated. In this example, a candidate protected session can be generated by the data processing system. The data processing system may then assign client devices to the candidate protected session by updating the candidate protected network session to include an identifier of the client device. Some network applications may have a minimum number of users. For example, network applications associated with certain styles of poker may have a minimum number of players. In response to determining that the number of client devices participating in a candidate protected network session (e.g., number of players of a network application) satisfies a threshold, the data processing system may initiate the candidate protected network session. Initiating the candidate protected network session can include starting operations of the network application. For example, initiating the candidate protected network session can start a game of electronic poker between client devices of the candidate protected network session. In some examples, client devices may not be added to network sessions after the network sessions have been initiated. For example, candidate protected network sessions may be removed from the plurality of candidate protected network sessions that the data processing system can identify possible candidate protected network sessions to assign a client device to when the candidate protected network session is initiated.

In some implementations, the data processing system may initiate candidate protected network sessions based on the request from the first client device. For example, the first client device may transmit a request to initiate the second candidate protected network session. The data processing system may initiate the second candidate protected network session based on this request. In an example, the first client device may hit a button indicating a request for the network session (e.g., electronic game of poker) to start. In some examples, the candidate protected network session may be initiated based on receiving a request from a threshold number of client devices assigned to the candidate protected network session. In an example, there may be additional conditions to start candidate protected network sessions. For example, the second candidate protected network session may be initiated based on receiving a request to from a client device to initiate the candidate protected network session and being associated with a threshold number of participating client devices.

At least one aspect of the present disclosure is directed to a method. The method can include receiving, from a first client device of a plurality of client devices, a request to access one of a plurality of protected network sessions associated with a network application. The method can include identifying a first candidate protected network session of the plurality of protected network sessions, the first candidate protected network session identifying a subset of the plurality of client devices. The method can include determining that the first candidate protected network session fails to satisfy at least one security criterion based on location information of the first client device and respective location information of each client device of the subset. The method can include identifying a second candidate protected network session of the plurality of protected network sessions based on the first candidate protected network session failing to satisfy the at least one security criterion. The method can include updating the second candidate protected network session to include an identifier of the first client device based on the second candidate protected network session satisfying the at least one security criterion.

The method can include determining the location information based on the request to access one of the plurality of protected network sessions. The method can include determining the location information by transmitting a request for the location information to a computing system. The method can include determining the location information based on at least one identifier of a network via which the first client device transmitted the request to access one of the plurality of protected network sessions. The method can include determining that the first candidate protected network session fails to satisfy the at least one security criterion based on the location information indicating that the first client device is located within a threshold distance of at least one client device of the subset. The method can include initiating the second candidate protected network session of the plurality of protected network sessions in response to determining that a number of client devices participating in the second candidate protected network session satisfies a threshold. The method can include determining, based on state information of the network application, that the network latency information of the first client device satisfies an interruption criterion for the application and selectively providing, to the first client device, first data corresponding to display of a first graphical content to represent the state information of the application based on the network latency information of the first client device satisfying the interruption criterion. The method can include selectively providing, to a second client device participating in the second candidate protected network session, second data corresponding to display of a second graphical content to represent the state information of the network application based on second network latency information of the second client device not satisfying the interruption criterion.

Figure 5:
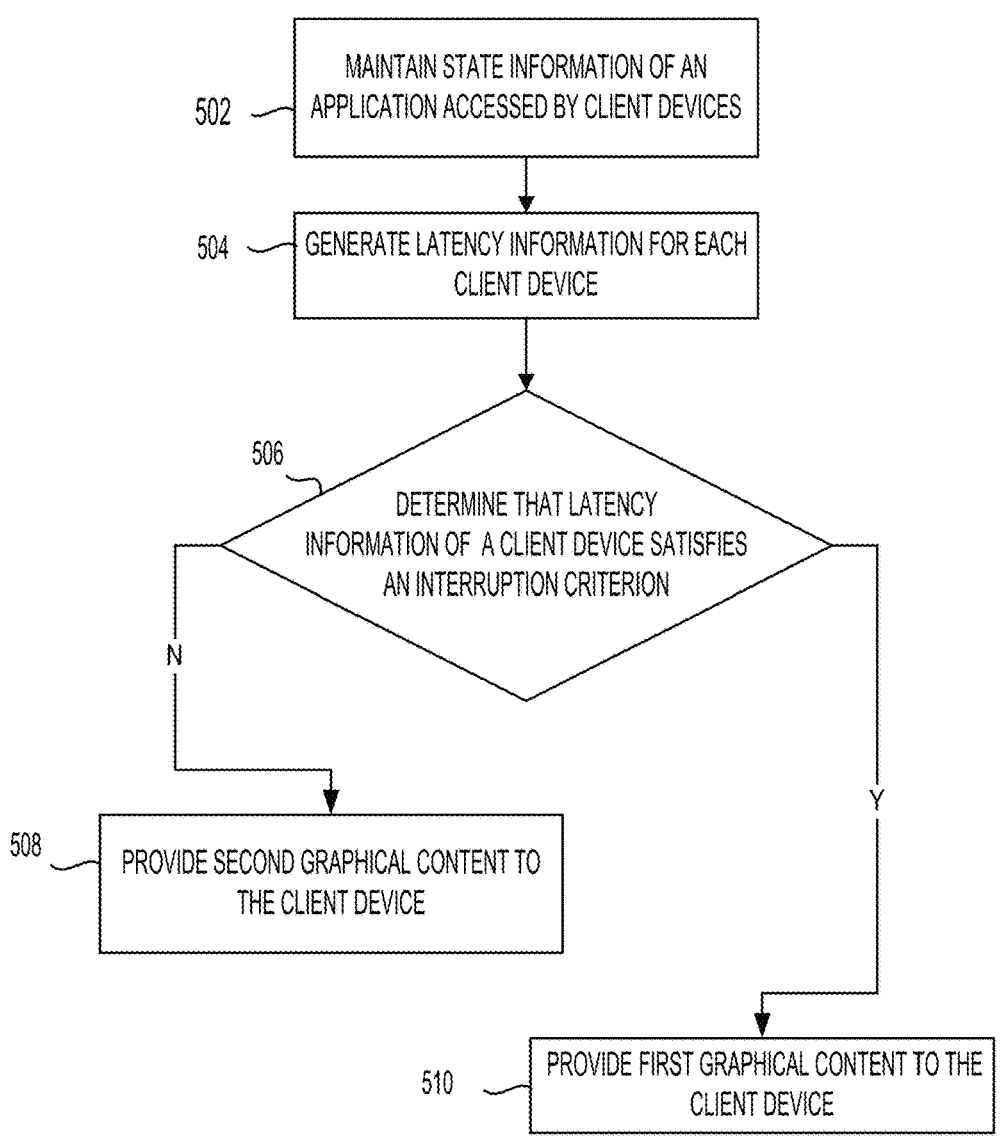
FIG. 5 illustrates an example flow diagram of a method for communicating application state information based on network latency, in accordance with one or more implementations.

Referring now to FIG. 5, depicted is an illustrative flow diagram of a method 500 for communicating application state information based on network latency. The method 500 can be executed, performed, or otherwise carried out by a data processing system. A data processing system (e.g., the data processing system 205) can be remote to one or more client devices and communicate with the one or more client devices via a computer network. In some implementations, the operations of method 500 can be performed by a standalone gaming device (e.g., without communicating with a gaming server to perform the method steps). In a brief overview of the method 500, the data processing system can maintain state information of an application accessed by client devices (STEP 502), generate network latency information for each client device (STEP 504), and determine whether network latency information of a client device satisfies an interruption criterion (STEP 506). In response to determining that the network latency information does not satisfy the interruption criterion, the data processing system may provide second graphical content to the client device (STEP 508). In response to determining that the network latency information does satisfy the interruption criterion, the data processing system may provide first graphical content to the client device (STEP 510).

In further detail of the method 500, the data processing system may maintain state information of the application (STEP 502). The state information may be associated with a protected network session of the application. Applications may be a structured framework that defines objectives, guidelines, and mechanics of an electronic game. For example, applications may define rules for a game such as electronic poker. Protected network sessions may be individual sessions of an application that identify a plurality of client devices accessing the application. For example, a protected network session can be a session of electronic poker associated with a set of client devices. In this example, these client devices can access the application to perform actions within the game of electronic poker (e.g., calling, raising, folding, and/or the like). In some examples, the client devices can be assigned to the protected network session according to the method 400 of FIG. 4. For example, the data processing system may not assign a first client device to a protected network session including a second client device that is within a threshold distance. In some examples, the data processing system may collect state information of the application throughout the protected network session. The state information can indicate the progression of the protected network session. For example, state information can include how many cards have been revealed (e.g., of community cards 308 of FIG. 3) or which client device has the current turn.

In some implementations, the state information can be updated based on communications from associated client devices. For example, client devices can transmit communications as part of the protected network session. The communications can include actions being selected by the client devices (e.g., call, fold, raise, and/or the like). In some examples, the communications can advance the state of the protected network session. For example, the protected network session may include a sequence of the associated client devices. The protected network session may wait for a first client device to submit an action. Once the data processing system receives an action from the first client device, the protected network session may wait for a second device to submit an action. This may continue in the sequence until an action has been received from each of the client devices. In an example, a protected network session may include several rounds of this sequence. In this example, the protected network session may terminate at the after the rounds of the sequence have been completed.

The data processing system may generate network latency information for each client device based on the network communications (STEP 504). The network latency information may indicate a response time for each client device. For example, when it is the turn of the first client device to submit an action, the data processing system may transmit an action query to the first client device. In this example, the first client device can transmit a response to the action query including a choice of action. Network latency information can include metrics of connection quality (e.g., jitter, packet drop rate, disconnection events, and/or the like). In an example, the network latency information for a client device can indicate a length of time between transmission of the action query and reception of the action query. In an example, the data processing system can determine that an action query has been received based on receiving an acknowledgement (e.g., acknowledgement packet) from the client device it was sent to.

In some examples, client devices enter a standby state where no action options (e.g., or limited action options) are available when not being queried for an action. As a result large latency times for the first client device can cause large standby times for other client devices. In some examples, large response times can be caused by network factors. For example, large response times can be caused by network congestion, lack of physical reception, hardware issues, and/or the like. As an example, large response times can be caused by poor signal due to the client device being in a location that is far from network infrastructure (e.g., the access point, cell phone tower, and/or the like). In some examples, large response times caused by network factors can be reduced by reducing the quantity of data being transmitted to and from the client device. For example, as transmitted data increases, issues such as packet loss, retransmission, congestion, and/or the like can lead to significantly longer transmission.

The data processing system may determine whether the network latency information of a client device satisfies an interruption criterion (STEP 506). The interruption criterion can include one or more threshold values for network quality metrics. For example, the interruption criterion can include a threshold number of dropped packets, threshold jitter length, threshold action query response time, and/or the like. In an example, the client device can satisfy the interruption criterion based on satisfying a combination (e.g., weighted or unweighted) of network quality metric thresholds. Satisfying the interruption criterion may indicate a poor network connection. This poor network connection can cause extended processing times between reception and transmission of data, which may increase standby times of other client devices associated with the protected network session.

In some implementations, the data processing system may determine the network latency information in response to determining that the state information satisfies a criterion. For example, the data processing system can determine network latency information in response to determining that the protected network session of the application has stalled. In this example, the criterion of the state information may be a threshold amount of time in a state (e.g., with no progression). Since client devices may enter a standby state until they are queried for an action choice, progression of a protected network session of an application can stall if no response is received from the client device being queried for an action choice.

In some implementations, the network latency information of a client device can include a type of network via which the client device is communicating. Various network types (e.g., 5G cellular network, 2.4 GHz Wi-Fi network, and/or the like). The type of network may impact the latency of communication between a client device and the data processing system. For example, a Wi-Fi network may have lower latency than a cellular network. As another example, a 5 GHz network may have lower latency than a 2.4 GHz network. The network latency information determined by the data processing system can include a type of network as an indicator of latency speeds that can be expected from a client device.

In some implementations, the data processing system can determine a network type of a client device based on a communication with that client device, which can indicate a network type. For example, a communication protocol (e.g., Wi-Fi 802.11ac, and/or the like) can indicate a network type as part of data transmissions. In this example, the communication protocol can include identifiers such as an address (e.g., IP address, MAC address, and/or the like) or network identifier (e.g., service set identifier (SSID), public land mobile network (PLMN) ID, and/or the like) that can indicate a network type. For example, these identifiers may serve as addresses for transmitting and receiving data between the client device and the data processing system. The data processing system can identify a network type from the communication (e.g., based on an identifier) and include this information as part of the network latency information for the client device.

In some implementations, the data processing system may determine that network latency information satisfies the interruption criterion based on the network latency information exceeding the threshold network latency. For example, the network latency can refer to the time it takes for data to travel from the data processing system to the client device. In an example, the data processing system may determine a network latency of an action query transmitted to the first client device. In this example, the data processing system may determine that this network latency exceeds a threshold network latency.

Based on determining that the network latency information of a client device satisfies the interruption criterion, the data processing system may selectively provide first data (STEP 510). For example, based on determining that the first client device satisfies the interruption criterion (e.g., indicating that it has a poor network connection), the data processing system may transmit first data. The first data can correspond to a display of a first graphical content (e.g., graphical user interface 302 of FIG. 3D) that represents state information of the application. For example, the first graphical content can indicate cards on the table, wagers that have been placed, actions submitted by client devices, and/or the like.

In an example, the first data can include instructions to display pre-loaded graphical elements from the client device. In an example, the client device may store one or more graphical elements. The graphical elements can be cached locally on the client device as part of data associated with the network application. By generating the graphical user interface using pre-loaded graphical elements, the amount of data transmitted over the network to the client device may be reduced. Additionally, or alternatively, the first data can include graphical elements that have a smaller file size (e.g., than graphical elements included in the second data). For example, graphical elements with a smaller file size may be compressed, have a reduced resolution, modified file format, and/or the like. The design elements of the graphical elements can also be modified, for example design elements such as objects (e.g., text, shapes, icons, and/or the like) or effects (e.g., animation) can be removed.

Based on determining that the network latency information of the first client device does not satisfy the interruption criterion, the data processing system may selectively provide second data (STEP 508). For example, based on determining that the second client device does not satisfy the interruption criterion (e.g., has an acceptable network connection), the data processing system may provide second data. The second data can correspond to a display of a second graphical content (e.g., graphical user interface 302 of FIG. 3C). that represents state information of the application. In some examples, the first data and the second data may represent the same state information of the application. For example, both the first data and the second data may include information that is critical to the application (e.g., hand rankings of a round of poker, community cards that are on the table, and/or the like). However, the first data may be smaller than the first. For example, the first data may be smaller (e.g., fewer bytes) than the second data. This can decrease the transmission time of graphical user interface to the client device, which can decrease latency of client devices with poor network connections.

In some implementations, the first and second data may include instructions that cause client devices to display graphical content. For example, data can include data files that specify how graphical content should be rendered. These instructions can define qualities of elements within the graphical content such as color, size, position, text, animation. In some examples, the first data may include first instructions that specify different graphical content than the second instructions. As an example, the first data may include fewer instructions than the second data, thereby defining fewer graphical elements within the graphical content. As another example the first data may include first instructions that define graphical elements that require less bandwidth to transmit than graphical elements defined by the second instructions, such as static elements in place of animated elements.

In some implementations, the first data may correspond to a static interface and the second data may correspond to an animated interface. For example, the second graphical content can be an animated interface that includes elements that move. Animated elements may be programmed change in color and size. As an example, animated elements may move on the screen of the second client device when the second client device is in a standby state. In this example, the animated element can be a loading symbol. As another example, these elements may move in response to user interaction. For example, a button may become bigger in response to being selected by a user. The first data may correspond to a static interface that does not move. For example, the static interface can include static elements that are stationary on the screen of the first client device.

In some implementations the animated interface may correspond to a loading interface. For example, the animated interface can include an animated symbol that indicates the graphical user interface is loading. As an example, the animated interface can include an hourglass (e.g., such as loading symbol 318 of FIG. 3A) that is animated to display sand falling through the hourglass. As another example, the animated interface can include a circle that is animated to spin. In described examples, the loading interface may be displayed at various phases of the protected network session. For example, the loading interface may be displayed before the protected network session is initiated while the data processing system while a client device is in a standby state.

In some implementations, the first and second data can indicate an interruption status. For example, the first data can include a first indication that the interruption criterion is satisfied. Likewise, the second data can include a second indication that the interruption criterion is not satisfied. The indications can be displayed as part of the graphical content. For example, the first graphical content can include a first graphical element indicating that the interruption criterion is satisfied. Additionally, or alternatively, the first graphical element can indicate that the graphical content may be simplified to mitigate the effects of the poor network connection. Similarly, the second graphical content can include a second graphical element indicating that the interruption criterion is not satisfied. For example, the second graphical element can indicate that the second client device has a good network connection.

At least one aspect of the present disclosure is directed to a method. The method can include maintaining state information of an application associated with a protected network session, the protected network session identifying a plurality of client devices accessing the application. The method can include generating network latency information for each client device based on at least one network communication from each client device of the plurality of client devices. The method can include determining, based on the state information of the application, that the network latency information of a first client device of the plurality of client devices satisfies an interruption criterion for the application. Based on this determination, the method can include selectively providing, to the first client device, first data corresponding to display of a first graphical content to represent the state information of the application based on the network latency information of the first client device satisfying the interruption criterion. The method can further include selectively providing, to a second client device of the plurality of client devices, second data corresponding to display of a second graphical content to represent the state information of the application based on the network latency information of the second client device not satisfying the interruption criterion.

The first data can correspond to a static interface and the second data can correspond to an animated interface. The static interface can be representative of the state information of the application, and the animated interface can correspond to a loading interface for the application. The method can include determining that the state information of the application satisfies at least one criterion. Responsive to this information, the method can further include determining that the network latency information for the first client device of the plurality of client devices satisfies the interruption criterion for the application in response to the state information of the application satisfying the at least one criterion. The method can include determining the network latency information of the first client device based on a network type of a network via which the first client device is communicating. The method can include determining the network type based on a communication received from the first client device. The method can include determining that the network latency information for the first client device satisfies the interruption criterion based on the network latency information exceeding a threshold network latency. The first data can include first instructions that cause the first client device to display the first graphical content, and the second data can include second instructions that cause the second client device to display the second graphical content. The first data can include a first indication that the at least one interruption criterion is satisfied, and the second data can include a second indication that the at least one interruption criterion is not satisfied.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for assigning protected network sessions for network applications, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
one or more processors configured to:
   maintain state information of an application associated with a protected network session, the protected network session identifying a plurality of client devices accessing the application;

generate network latency information for each client device based on at least one network communication from each client device of the plurality of client devices;
   determine, based on the state information of the application, that the network latency information of a first client device of the plurality of client devices satisfies an interruption criterion for the application;
   selectively provide, to the first client device, first data corresponding to a static interface that displays first graphical content to represent the state information of the application based on the network latency information of the first client device satisfying the interruption criterion; and
   selectively provide, to a second client device of the plurality of client devices, second data corresponding to an animated interface that displays second graphical content to represent the state information of the application based on the network latency information of the second client device not satisfying the interruption criterion.

2. The system of claim 1, wherein the static interface is representative of the state information of the application, and the animated interface corresponds to a loading interface for the application.

3. The system of claim 1, wherein the one or more processors are further configured to:
   determine that the state information of the application satisfies at least one criterion; and
   determine that the network latency information for the first client device of the plurality of client devices satisfies the interruption criterion for the application in response to the state information of the application satisfying the at least one criterion.

4. The system of claim 1, wherein the one or more processors are further configured to:
   determine the network latency information of the first client device based on a network type of a network via which the first client device is communicating.

5. The system of claim 4, wherein the one or more processors are further configured to:
   determine the network type based on a communication received from the first client device.

6. The system of claim 1, wherein the interruption criterion comprises a threshold network latency, and wherein the one or more processors are further configured to:
   determine that the network latency information for the first client device satisfies the interruption criterion based on the network latency information exceeding the threshold network latency.

7. The system of claim 1, wherein the first data comprises first instructions that cause the first client device to display the first graphical content, and the second data comprises second instructions that cause the second client device to display the second graphical content.

8. The system of claim 1, wherein the first data comprises a first indication that the interruption criterion is satisfied, and the second data comprises a second indication that the interruption criterion is not satisfied.

9. The system of claim 1, wherein the one or more processors are further configured to:
   update the state information of the application based on at least one communication from the first client device or the second client device.

10. A method, comprising:
   maintaining, by at least one processor, state information of an application associated with a protected network session, the protected network session identifying a plurality of client devices accessing the application;

generating, by the at least one processor, network latency information for each client device based on at least one network communication from each client device of the plurality of client devices;

determining, by the at least one processor, based on the state information of the application, that the network latency information of a first client device of the plurality of client devices satisfies an interruption criterion for the application;

selectively providing, by the at least one processor to the first client device, first data corresponding to a static interface that displays first graphical content to represent the state information of the application based on the network latency information of the first client device satisfying the interruption criterion; and selectively providing, by the at least one processor to a second client device of the plurality of client devices, second data corresponding to an animated interface that displays second graphical content to represent the state information of the application based on the network latency information of the second client device not satisfying the interruption criterion.

11. The method of claim 10, wherein the static interface is representative of the state information of the application, and the animated interface corresponds to a loading interface for the application.

12. The method of claim 10, further comprising:

determining, by the at least one processor, that the state information of the application satisfies at least one criterion; and determining, by the at least one processor, that the network latency information for the first client device of the plurality of client devices satisfies the interruption criterion for the application in response to the state information of the application satisfying the at least one criterion.

13. The method of claim 10, further comprising:

determining, by the at least one processor, the network latency information of the first client device based on a network type of a network via which the first client device is communicating.

14. The method of claim 13, further comprising:

determining, by the at least one processor, the network type based on a communication received from the first client device.

15. The method of claim 10, wherein the interruption criterion comprises a threshold network latency, further comprising:

determining, by the at least one processor, that the network latency information for the first client device satisfies the interruption criterion based on the network latency information exceeding the threshold network latency.

16. The method of claim 10, wherein the first data comprises first instructions that cause the first client device to display the first graphical content, and the second data comprises second instructions that cause the second client device to display the second graphical content.

17. The method of claim 10, wherein the first data comprises a first indication that the interruption criterion is satisfied, and the second data comprises a second indication that the interruption criterion is not satisfied.

18. The method of claim 10, further comprising:

updating, by the at least one processor, the state information of the application based on at least one communication from the first client device or the second client device.

* * * * *